(12) United States Patent
Maguire et al.

(10) Patent No.: US 10,926,662 B2
(45) Date of Patent: Feb. 23, 2021

(54) OCCUPANT DETECTION AND CLASSIFICATION SYSTEM

(71) Applicant: Joyson Safety Systems Acquisition LLC, Auburn Hills, MI (US)

(72) Inventors: Phillip Bernard Maguire, Auburn Hills, MI (US); Daniel Tabar, Auburn Hills, MI (US); David Haggitt, Auburn Hills, MI (US); Jeffrey Bennett, Auburn Hills, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 191 days.

(21) Appl. No.: 15/655,542

(22) Filed: Jul. 20, 2017

(65) Prior Publication Data
US 2018/0022233 A1    Jan. 25, 2018

Related U.S. Application Data

(60) Provisional application No. 62/364,786, filed on Jul. 20, 2016.

(51) Int. Cl.
| *B60N 2/00* | (2006.01) |
| *B60R 21/015* | (2006.01) |
| *B60R 21/01* | (2006.01) |
| *B60R 22/48* | (2006.01) |
| *G01N 27/22* | (2006.01) |
| *B60R 21/00* | (2006.01) |

(52) U.S. Cl.
CPC .............. *B60N 2/002* (2013.01); *B60R 21/01* (2013.01); *B60R 21/015* (2013.01); *B60R 22/48* (2013.01); *G01N 27/228* (2013.01); *B60R 2021/0032* (2013.01); *B60R 2021/01211* (2013.01); *B60R 2022/4858* (2013.01); *B60R 2022/4866* (2013.01)

(58) Field of Classification Search
CPC combination set(s) only.
See application file for complete search history.

(56) References Cited

U.S. PATENT DOCUMENTS

| 4,540,979 A | 9/1985 | Gerger et al. |
| 4,631,976 A | 12/1986 | Noda et al. |
| 5,563,354 A | 10/1996 | Kropp |

(Continued)

FOREIGN PATENT DOCUMENTS

| CN | 101462526 A | 6/2009 |
| DE | 102012000572 | 7/2013 |
| JP | 5135242 B2 | 2/2013 |

OTHER PUBLICATIONS

Comeford, "Proximity Sensing Solutions, Part1: Capacitive Sensors", DigiKey Electronics, Sep. 19, 2013, 3 pages.

(Continued)

*Primary Examiner* — Maceeh Anwari
(74) *Attorney, Agent, or Firm* — Meunier Carlin & Curfman LLC

(57) ABSTRACT

An occupant detection system includes a controller, a sensing electrode, and a shield electrode, the electrodes disposed in a vehicle seat. The controller is electrically coupled to the sensing electrode and shield electrode by a sensing circuit. The controller is configured to send an input signal to the sensing electrode, the shield electrode, or both and measures current, impedance, or capacitance values to determine the presence of an object on the seat, to classify the object, or both.

24 Claims, 12 Drawing Sheets

(56) References Cited

U.S. PATENT DOCUMENTS

| | | | |
|---|---|---|---|
| 6,016,103 A | 1/2000 | Leavitt | |
| 6,076,853 A | 6/2000 | Stanley | |
| 6,333,736 B1 | 12/2001 | Sandbach | |
| 6,382,667 B1 | 5/2002 | Aoki | |
| 6,392,542 B1 | 5/2002 | Stanley et al. | |
| 6,459,974 B1 | 10/2002 | Baloch et al. | |
| 6,501,463 B1 | 12/2002 | Dahley et al. | |
| 6,590,499 B1 | 7/2003 | D'Agosto | |
| 6,808,201 B2 | 10/2004 | Aoki | |
| 6,906,700 B1 | 6/2005 | Armstrong | |
| 6,918,610 B2 | 7/2005 | Song et al. | |
| 7,126,583 B1 | 10/2006 | Breed | |
| 7,234,945 B2 | 7/2007 | Breed et al. | |
| 7,649,278 B2 | 1/2010 | Yoshida | |
| 7,688,213 B2 | 3/2010 | Power | |
| 7,830,265 B2 | 11/2010 | Power | |
| 7,860,625 B2 | 12/2010 | Jaramillo et al. | |
| 7,928,341 B2 | 4/2011 | Ito et al. | |
| 8,011,234 B2 | 9/2011 | Kandler | |
| 8,269,731 B2 | 9/2012 | Molne | |
| 8,564,424 B2 | 10/2013 | Evarts et al. | |
| 8,698,764 B1 | 4/2014 | Karakotsios et al. | |
| 8,896,326 B2 | 11/2014 | Stanley et al. | |
| 8,952,907 B2 | 2/2015 | Brown et al. | |
| 8,983,732 B2 | 3/2015 | Lisseman et al. | |
| 9,007,190 B2 | 4/2015 | Bosch et al. | |
| 9,248,851 B2 | 2/2016 | Van'tZelfde et al. | |
| 2002/0059022 A1 | 5/2002 | Breed et al. | |
| 2003/0083795 A1 | 5/2003 | Stanley et al. | |
| 2004/0267422 A1 | 12/2004 | Bossier et al. | |
| 2005/0052426 A1 | 3/2005 | Hagermoser et al. | |
| 2005/0273218 A1 | 12/2005 | Breed et al. | |
| 2006/0025897 A1 | 2/2006 | Shostak et al. | |
| 2006/0109256 A1 | 5/2006 | Grant et al. | |
| 2006/0177212 A1 | 8/2006 | Lamborghini et al. | |
| 2006/0196281 A1 | 9/2006 | Koors | |
| 2006/0231320 A1 | 10/2006 | Kamizono et al. | |
| 2006/0248478 A1 | 11/2006 | Liau | |
| 2006/0262103 A1 | 11/2006 | Hu et al. | |
| 2006/0284839 A1 | 12/2006 | Breed et al. | |
| 2007/0029768 A1 | 2/2007 | Clos et al. | |
| 2007/0192007 A1 | 8/2007 | Stanley et al. | |
| 2008/0202912 A1 | 8/2008 | Boddie et al. | |
| 2009/0001855 A1 | 1/2009 | Lipton et al. | |
| 2009/0160529 A1 | 6/2009 | Lamborghini et al. | |
| 2009/0292423 A1 | 11/2009 | Norton | |
| 2010/0053087 A1 | 3/2010 | Dai et al. | |
| 2010/0231239 A1 | 9/2010 | Tateishi et al. | |
| 2010/0250071 A1 | 9/2010 | Pala et al. | |
| 2010/0268426 A1 | 10/2010 | Pathak et al. | |
| 2010/0277186 A1 | 11/2010 | Bieck et al. | |
| 2010/0301880 A1 | 12/2010 | Stanley et al. | |
| 2010/0315267 A1 | 12/2010 | Chung et al. | |
| 2011/0037721 A1 | 2/2011 | Cranfill et al. | |
| 2011/0115500 A1 | 5/2011 | Stanley et al. | |
| 2011/0133919 A1 | 6/2011 | Evarts et al. | |
| 2011/0175844 A1 | 7/2011 | Berggren | |
| 2011/0210926 A1 | 9/2011 | Pasquero et al. | |
| 2011/0216015 A1 | 9/2011 | Edwards | |
| 2011/0290038 A1 | 12/2011 | Hoshino et al. | |
| 2012/0038468 A1 | 2/2012 | Provancher | |
| 2012/0126965 A1 | 5/2012 | Sanma et al. | |
| 2012/0232751 A1 | 9/2012 | Guspan | |
| 2012/0296528 A1 | 11/2012 | Wellhoefer et al. | |
| 2014/0076063 A1 | 3/2014 | Lisseman et al. | |
| 2014/0092025 A1 | 4/2014 | Pala et al. | |
| 2014/0197942 A1 | 7/2014 | Tabaczynski et al. | |
| 2014/0224040 A1 | 8/2014 | Van'tZelfde et al. | |
| 2015/0203064 A1 | 7/2015 | Dolcetti et al. | |
| 2015/0205421 A1 | 7/2015 | Lin et al. | |

OTHER PUBLICATIONS

International Search Report and Written Opinion issued in International Application No. PCT/US2017/043076, dated Sep. 28, 2017, 20 pages.

International Preliminary Report on Patentability issued for International Application No. PCT/US2017/043076, dated Jan. 31, 2019, 6 pages.

Office Action issued in CN Application No. 201780054871.3; dated Dec. 4, 2020; 54 pages.

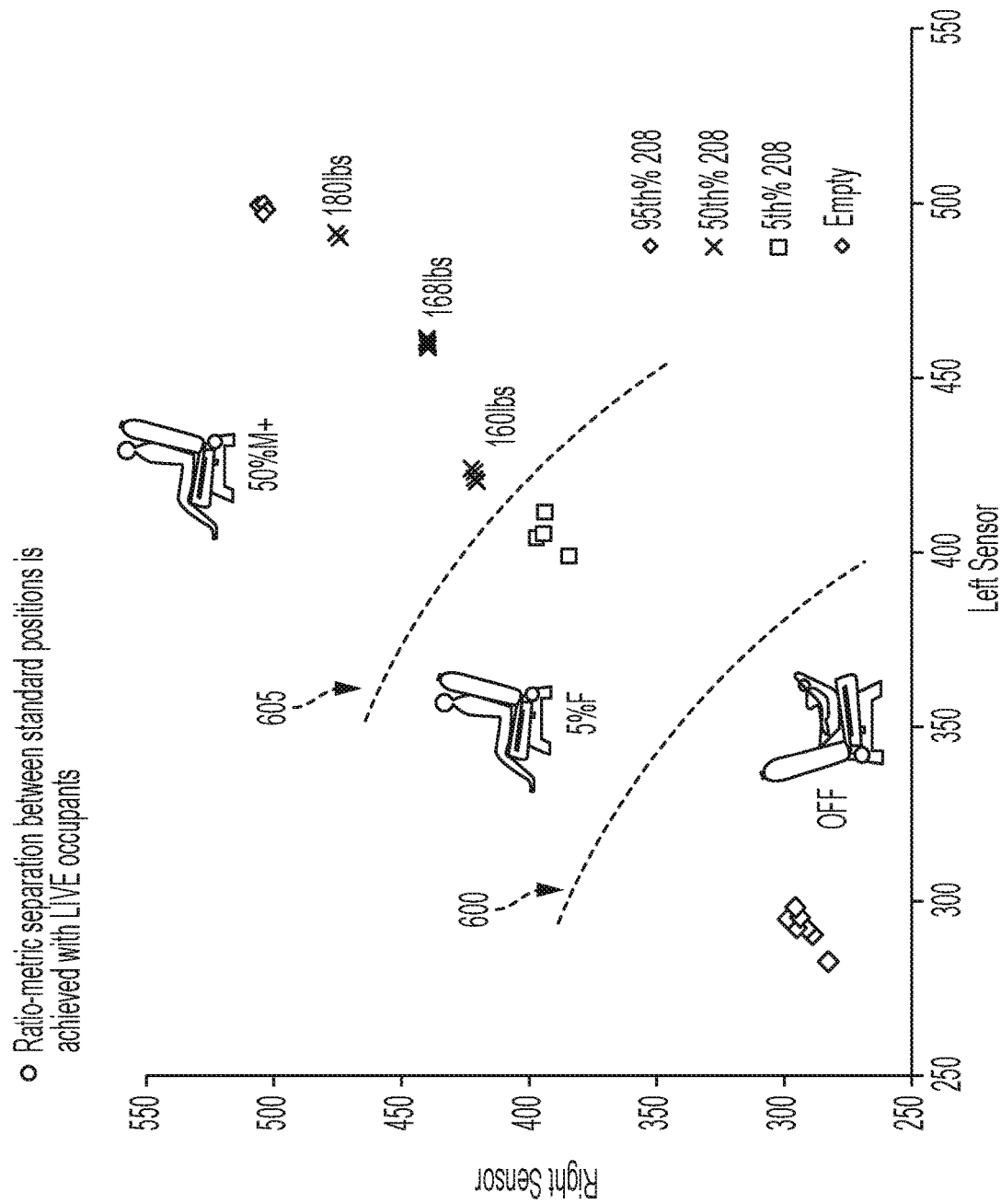

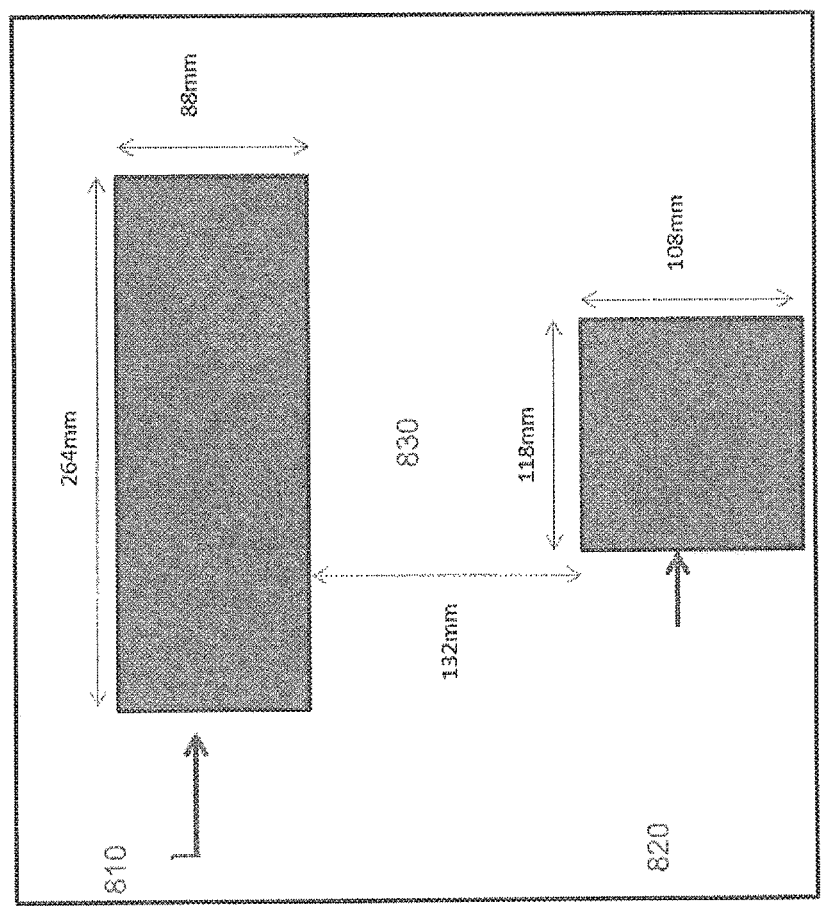

OCCUPANT DETECTION AND CLASSIFICATION SYSTEM

CROSS REFERENCE TO RELATED APPLICATIONS

This application claims priority to and incorporates by reference provisional patent application Ser. No. 62/364,786 entitled Occupant Detection and Classification System filed on Jul. 20, 2016.

BACKGROUND

The present disclosure relates generally to the field of capacitive sensing systems and sensing methods. More specifically, the disclosure relates to capacitive sensing systems and sensing methods for a vehicle seat.

There is a need for a system and method for accurate differentiation of an occupant from an object placed on a seat in an occupant classification system. In earlier occupant classification systems, an occupant detection system may comprise a seat weight sensor and an electric field sensor, each operatively connected to a controller for detecting an occupant in a vehicle. The seat weight sensor is adapted to generate a measure of weight upon the vehicle seat, e.g. upon the associated seat bottom. The electric field sensor comprises at least one electrode located, for example, in the seat bottom under the seat cover and close to the top of a foam cushion, and adapted to enable a type of occupant or object that may be upon the seat bottom of the vehicle seat to be distinguished.

The seat weight sensor is responsive to a force upon the vehicle seat. The seat weight sensor, for example, may comprise one or more load cells operatively coupled to at least one load path between the seat bottom and the vehicle, e.g. between the seat frame and the floor pan of the vehicle, e.g. at the corners of the seat frame, so as to measure the weight of the entire vehicle seat and objects or occupants placed thereon. For example, the one or more load cells could use a strain gage, a magnetic-restrictive sensing element, a force sensitive resistive element, or another type of sensing element to measure the associated load. For example, the seat weight sensor may be constructed in accordance with the teachings of U.S. Pat. Nos. 5,905,210, 6,069,325 or 6,323,444, each of which is incorporated herein by reference.

The seat weight sensor may alternately comprise at least one mass sensing element, e.g. a force sensitive resistive element, a membrane switch element, a pressure sensitive resistive contact, a pressure pattern sensor, a strain gage, a bend sensor, or a hydrostatic weight sensing element, operatively coupled to one or more seating surfaces in the seat base or seat back, e.g. in accordance with the teachings of U.S. Pat. Nos. 5,918,696, 5,927,427, 5,957,491, 5,979,585, 5,984,349, 5,986,221, 6,021,863, 6,045,155, 6,076,853, 6,109,117 or 6,056,079, each of which is incorporated herein by reference. For example, the seat sensor may comprise a hydrostatic sensing element—e.g. a fluid containing bladder, underneath the seat cover of the seat bottom and supported by the seat frame—wherein a pressure sensor operatively connected to the bladder measures the pressure of the fluid contained therein so as to provide a measure of occupant weight. The pressure sensor is operatively connected to the controller so as to provide a pressure signal thereto, which determines a measure of weight therefrom. A seat weight sensor within the cushion of the vehicle seat e.g. in the seat bottom only, would typically not be as accurate as a seat weight sensor that measures the weight of the entire vehicle seat but would still provide information about the weight of an occupant on the vehicle seat sufficient for the occupant detection system to control a restraint actuator, e.g. an air bag inflator module, responsive thereto. The particular type of seat weight sensor is not considered to be limiting. The seat weight sensor may, for example, be integrated with either the seat frame or the seat bottom.

As used herein, the term "electric field sensor" refers to a sensor that generates a signal responsive to the influence of that being sensed, upon an electric field. Generally, an electric field sensor comprises at least one electrode to which is applied at least one applied signal; and at least one electrode—which could be the same electrode or electrodes to which the applied signal is applied—at which a received signal (or response) is measured. The applied signal generates an electric field from the at least one electrode to a ground in the environment of the at least one electrode, or to another at least one electrode. The applied and received signals can be associated with the same electrode or electrodes, or with different electrodes. The particular electric field associated with a given electrode or set of electrodes is dependent upon the nature and geometry of the electrode or set of electrodes and upon the nature of the surroundings thereto, for example, the dielectric properties of the surroundings. For a fixed electrode geometry, the received signal or signals of an electric field sensor are responsive to the applied signal or signals and to the nature of the environment influencing the resulting electric field, for example to the presence and location of an object having a permittivity or conductivity different from that of its surroundings.

One form of electric field sensor is a capacitive sensor, wherein the capacitance of one or more electrodes is measured—from the relationship between received and applied signals—for a given electrode configuration. The technical paper "Field mice: Extracting hand geometry from electric field measurements" by J. R. Smith, published in IBM Systems Journal, Vol. 35, Nos. 3 & 4, 1996, pp. 587-608, incorporated herein by reference, describes the concept of electric field sensing as used for making non-contact three-dimensional position measurements, and more particularly for sensing the position of a human hand for purposes of providing three dimensional positional inputs to a computer. What has commonly been referred to as capacitive sensing actually comprises the distinct mechanisms of what the author refers to as "loading mode," "shunt mode", and "transmit mode" which correspond to various possible electric current pathways. In the "shunt mode", a voltage oscillating at low frequency is applied to a transmit electrode, and the displacement current induced at a receive electrode is measured with a current amplifier, whereby the displacement current may be modified by the body being sensed. In the "loading mode", the object to be sensed modifies the capacitance of a transmit electrode relative to ground. In the "transmit mode", the transmit electrode is put into circuit transmission with the user's body, which then becomes a transmitter relative to a receiver, either by direct electrical connection or via capacitive coupling.

Accordingly, the electric field sensor is either what is commonly known as a capacitive sensor, or more generally an electric field sensor operating in any of the above described modes. The electric field sensor comprises at least one electrode operatively coupled to at least one applied signal so as to generate an electric field proximate to the at least one electrode, responsive to the applied signal. The applied signal, for example, comprises either an oscillating or pulsed signal. At least one electrode is operatively coupled to a sensing circuit that outputs at least one response signal responsive to the electric field at the corresponding electrode wherein the response signal is responsive to at least one electric-field-influencing property—for example, dielectric constant, conductivity, size, mass or distance—of an object proximate to the electric field sensor. For example, for the electric field sensor as a capacitance sensor, the sensing circuit measures the capacitance of at least one electrode with respect to either another electrode or with respect to a surrounding ground, for example, a seat frame of the vehicle seat, connected to circuit ground. The at least one applied signal is, for example, generated by the sensing circuit that also outputs the at least one response signal. The sensing circuit and associated at least one applied signal may be adapted to be responsive to the influence of a water soaked vehicle seat, on measurements from the electric field sensor.

The electric field sensor generates an electric field from the applied signal applied to at least one electrode and senses objects proximate to the associated at least one electrode, for example in the seat bottom of a vehicle seat, from the influence of the electric field on the response signal. The at least one electrode of the electric field sensor, the applied signal applied thereto, and the sensitivity of the sensing circuit are all adapted so that the electric field sensor is, for example, substantially non-responsive to objects that are more than 50 mm above the seat bottom but is substantially responsive to occupants that are normally seated directly on the vehicle seat.

The at least one electrode of the electric field sensor is adapted so as to provide for distinguishing seating conditions for which a restraint actuator, for example an air bag inflator module, should be deployed from seating conditions for which the restraint actuator should not be deployed, so as to avoid causing more injury to an occupant than the occupant would otherwise incur without the deployment of the restraint actuator. For example, the electrode is adapted so that a capacitance of the at least one electrode with respect to a circuit ground is substantially greater for a seating condition for which the restraint actuator should be deployed, for example an occupant seated in substantially normal seating position on the vehicle seat or a large body immediately above the seat bottom; than for a seating condition for which the restraint actuator should not be deployed, for example an empty vehicle seat, an infant, child, or booster seat on the vehicle seat with or without an infant or child seated therein, or an occupant on the vehicle seat in a position that is substantially different from a normal seating position. The at least one electrode is, for example, located under the seat cover and substantially the same size as a region to be sensed on the vehicle seat, extending from near the back of the seat bottom to near the front of the seat bottom. As described herein below, sections of the at least one electrode are removed or selectively shielded so as to selectively reduce the sensitivity thereof proximate to regions where an infant or child, in an infant, child, or booster seat, is closest to the vehicle seat, so as to provide for distinguishing between a child seated in a child seat and an occupant that is seated directly on the vehicle seat. Responsive to a child in a child seat on the vehicle seat, the increase in capacitance of the electrode of the electric field sensor in the seat bottom, relative to that of an empty vehicle seat, is relatively small.

Stated in another way, the electric field sensor has a relatively short range and principally senses an occupant when a large surface of the occupant is relatively close to the sensor. Occupants normally seated directly on the seat cover typically have a large surface of their body relatively close to the electrode. When infants or children are in child seats, most of their body is elevated several inches off the seat bottom surface, resulting in a relatively small influence upon the electric field sensor. The electric field sensor in the seat bottom distinguishes between a large body immediately above the seat cover—for example a normally seated, forward facing occupant in the seat—and an infant or child seat—including rear facing, front facing and booster seats—located on a vehicle seat. When the vehicle seat contains a child seat (including a rear facing infant seats, a forward facing child seat and a booster seats), or when the vehicle seat is empty, no forward facing occupant is detected near to the seat bottom and, as a result, the electric field sensor causes the restraint actuator to be disabled.

An electrode of the electric field sensor may be constructed in a variety of ways, and the method of construction is not considered limiting. For example, an electrode may be constructed using rigid circuit board or a flexible circuit using known printed circuit board techniques such as etching or deposition of conductive materials applied to a dielectric substrate. Alternately, an electrode may comprise a discrete conductor, such as a conductive film, sheet or mesh that is distinct from or an integral part of the vehicle seat or components thereof. The assembly of one or more electrodes together with the associated substrate is sometimes referred to as a sensing pad or a capacitive sensing pad.

The above described technology has also been incorporated in occupant classification systems using a heater as a sensor. The seat may include a heater controller to regulate the heaters in the seat bottom and/or the seat back and an electronic control unit (ECU) coupled to the sensors in the seat bottom and/or seat back to detect and categorize an object or occupant in the seat. The ECU may include sensing and measurement circuits. If the sensor is integrated into the heater system, the heater controller and the ECU may be connected in series such that power and/or control signals may be provided to the conductor (i.e., sensing and heater device) by, for example, the heater controller through the ECU. While the heater controller and the ECU are often provided under the seat bottom of a vehicle, in various embodiments the heater controller may be provided elsewhere in the vehicle.

Up to now, the Occupant Classification Systems of the prior art have depended upon either the above noted capacitive sensing methods or a seat weight rail system. A seat weight rail system measures deflection of the seat rails and determines a weight on the seat. This gives 5 states of measurement: 1 yo, 3 yo, hyo, 5th female, 50th male. This system is expensive and heavy (a concern for electric vehicles).

Embodiments of an Occupant Classification System using seat weight rail systems, capacitive sensing, and heater as a sensor embodiments have been heavily scrutinized by regulatory bodies in the United States and abroad. For example, in the United States, Federal Motor Vehicle Safety Standards No. 208 (FMVSS 208) has recognized deficiencies in the use of capacitive sensing and heater as a sensor embodiments for occupant classification. In particular, these prior embodiments do not adequately provide clear occupant classification distinctions between vehicle occupants that, with the technology described above, must be grouped together. For example, in the case of capacitive sensing, the system is not accurate enough to provide classification beyond "large" (e.g., 5th percentile sized female and larger) and "small"

(infant or empty vehicle seat). A system of occupant classification, using capacitive sensing, for example, may distinguish a general division in classes with infant—female separation in weight classes providing the only classification threshold. This threshold, however, does not provide the best resolution to distinguish the characteristics of occupants within the large and small categories.

Infant-Female separation is a weight based measurement system using capacitance as described above but only provides a two state solution. Several publicly available charts promulgated by the National Highway Traffic Safety Administration show how the United States regulation FMVSS 208 has mapped certain un-identifiable and non-classifiable grey zones in traditional occupant classification systems, namely a system using a heater as a sensor technology for capacitive sensing. The grey zones in these public documents reflect that currently used occupant systems are largely ineffective to determine physical characteristics, and associated safety protocols, when occupants are between the traditional small and large classifications (e.g., small adults sized larger than a six year old child and smaller than a $5^{th}$ percentile female, as well as adults sized between $5^{th}$ percentile females and $50^{th}$ percentile males). The following table shows certain categories used today to illustrate occupant classification: in the chart of FIG. 1A:

| | |
|---|---|
| 1 YO | 1 Year Old Infant |
| 3 YO | 3 Year Old Child |
| 6 YO | 6 Year Old Child |
| $5^{th}$ Fe | $5^{th}$ Percentile Female by Weight - Live |
| $50^{th}$ Male | $50^{th}$ Percentile Male by Weight - Live |

Again, these categories show unreliable grey zones between a six year old child and a small adult who can weigh significantly less than 100 pounds. The same kind of grey zone is present between females weighing over 120 pounds and men weighing, for example, under 135 pounds. Accuracy in these categories is extremely important in regulations dictating how vehicle manufacturers design vehicle seats, air bag deployment statuses, and numerous safety features in a vehicle. Upon the above considerations, new guidelines from regulatory bodies such as the United States New Car Assessment Program via the National Highway and Transportation Safety Administration require improved occupant classification technologies to remedy the grey zones in traditional classification systems. In fact, certain prior art technology, such as older seat track position sensors, will no longer be allowed for occupant classification purposes.

BRIEF SUMMARY OF THE DISCLOSURE

In one embodiment, this disclosure describes a system for classifying an occupant in a vehicle, wherein the system includes at least one pair of occupant classification sensors, each occupant classification sensor having a sensing electrode mountable in a seat bottom of a vehicle seat and a shield electrode located in the vehicle seat opposite the sensing electrode. A respective sensing circuit operatively couples to the respective sensing electrode and shield electrode for each occupant classification sensor in the at least one pair. A controller having access to computer memory operatively couples to the respective sensing circuits. The controller operates to configure the respective sensing circuits into a plurality of circuit configurations, wherein, within the circuit configurations, the sensing electrode and the shield electrode are electrically coupled to the sensing circuit. The controller sends a control signal to the sensing circuit and measures a plurality of sensing current measurements. Each sensing current measurement corresponds to one of the circuit configurations, wherein the sensing circuit is further configured to detect a change in at least one current characteristic of sensing current on at least one pair of sensing electrodes due to the presence of the object located on the vehicle seat. The sensing circuits corresponding to the at least one pair of sensing electrodes provide, to the controller, a respective output signal corresponding to a respective change in the sensing current on the respective sensing electrodes. The memory stores threshold data establishing occupant classifications according to threshold boundaries, and the controller uses the respective output signals as a coordinate pair to identify a respective occupant classification for the coordinate pair relative to the threshold boundaries.

In another embodiment, the memory stores threshold data establishing occupant classifications according to threshold boundaries in a coordinate system comprising Q values of the first occupant classification sensor on an x-axis and additional Q values of the second occupant classification sensor on the y-axis, wherein Q values represent magnitudes of the quadrature components of sensing current signals on respective sensing electrodes of each occupant classification sensor.

BRIEF DESCRIPTION OF THE DRAWINGS

These and other features, aspects, and advantages of the present invention will become apparent from the following description and the accompanying exemplary embodiments shown in the drawings, which are briefly described below.

FIG. 5 is a schematic showing threshold characteristics of three classes identified with the embodiments of an occupant classification system as described herein.

FIG. 8 is a top plan view of a front and rear occupant classification sensor on a support structure for installing into a vehicle seat as described herein.

DETAILED DESCRIPTION

Figure 1:
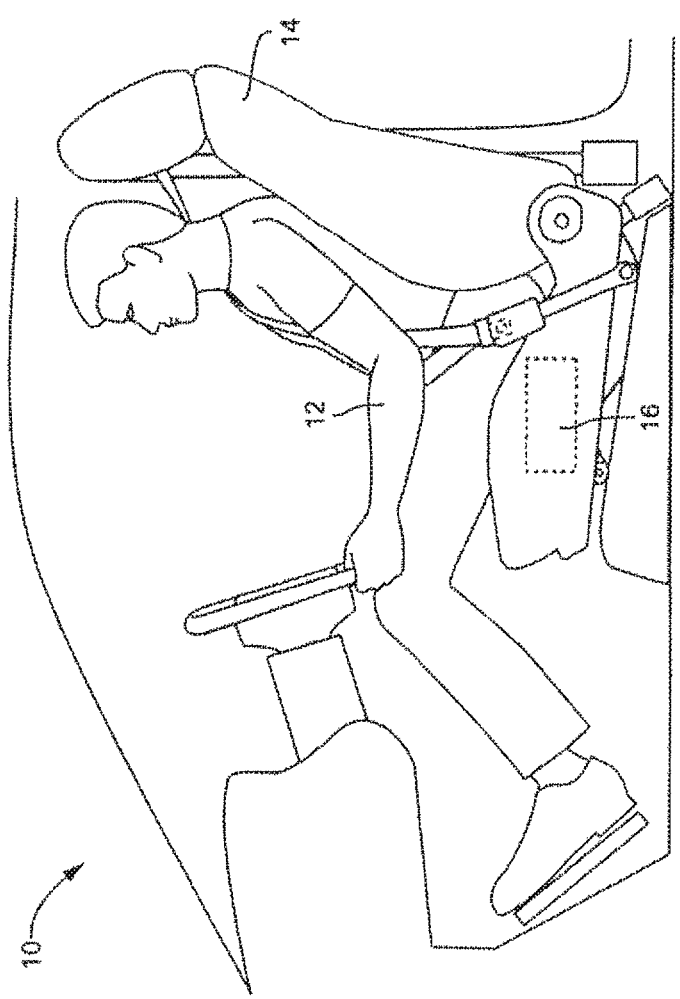
FIG. 1 is a schematic diagram of a vehicle seat incorporating occupant classification features, according to exemplary embodiments.

The figures illustrate the exemplary embodiments in detail. However, it should be understood that the application is not limited to the details or methodology set forth in the description or illustrated in the figures. It should also be understood that the terminology is for the purpose of description only and should not be regarded as limiting.

A capacitive or electric field type sensor for use in an occupant classification system or occupant sensing system (for example, a system to detect occupancy of a vehicle seat) may be implemented in many ways. For example, according to one embodiment, an AC current may be provided to a sensing electrode located in a vehicle seat. The current or change in the current to the sensor may be measured and used as an indicator of the impedance from the sensing electrode to ground. In certain vehicle seat configurations, a seat heater may be provided.

In an occupant classification system, the occupant is classified using information from sensors that sense characteristics about the object located on a vehicle seat. Some systems sense the total weight on the seat. When a capacitive sensor is used to classify the occupant, the environment above the seat cover is sensed using various techniques to identify the dielectric and conductive properties of the occupant. A conductive sensing element is placed in the seat and, according to one embodiment, the impedance from the electrode to ground may be used as an indicator of the occupant situation above the seat cover.

The occupant detection and classification system is configured so that the environment below the seating surface does not influence the classification of the occupant. When a seat heater is provided, typically a resistive heater is employed. A resistive heater is essentially a grounded wire or conductor located in the vehicle seat. The sensing electrode for an occupant classification and detection system may be placed above the seat heater. If the orientation between the sensing electrode and the heater changes, the offset capacitance will change and the change may result in a negative impact on the ability of the system to accurately classify the occupant. For example, the detection system may be configured to include an offset for the measurement of an empty seat conduction. If the empty seat offset of the measurement drifts significantly (e.g., due to a change in orientation of the electrode and heater), the system may not accurately classify the occupant.

According to various exemplary embodiments, a sensing system for automotive occupant classification may use various conductors in the seat as sensing electrodes. For example, the sensing system may include a "sensor" conductor or assembly located proximate a "shield" conductor. These two conductors, often embodied in non-limiting examples as planar electrodes, are collectively referred to in this application as an "occupant classification sensor." In the embodiments described herein, therefore, an "occupant classification sensor" has two components, namely the sensor portion and an accompanying shield.

The "sensor" and "shield" designations for either electrode may be reversed as noted below. The terms "upper" and "lower" refer to respective positions for electrodes in a vehicle seat in which the upper electrode is positioned between the lower electrode and an occupant sitting in the seat. In other words, an upper electrode typically rests between a vehicle ceiling and a vehicle floor with the lower electrode between the upper electrode and the vehicle floor. Similarly, right and left designations as used herein are from the perspective of a user viewing the vehicle seat from the steering wheel or front windshield generally, as oriented in FIG. 5. References to edges and surfaces designated as proximate and distal are from the perspective of an occupant's spine or back in an upright position on the seat. Some embodiments may refer to a first axis laterally extending across a vehicle seat from a left edge of the seat bottom to a right edge of the seat bottom (i.e., left and right designations are synonymous with edges of the vehicle seat facing respective vehicle doors for occupant entry). Another axis may include a center line extending from a front edge to a rear edge of the seat bottom (i.e., front and rear designations are synonymous with seat edges facing a front hood and a rear trunk of the vehicle).

In any given embodiment, the "shield" conductor is configured to reduce sensitivity of the sensing system to or interference from objects opposite the shield (e.g., when the lower planar electrode is the shield, the shield prevents interference from a lower positioned seat pan, seat heater, etc.; when the upper planar electrode is the shield, the shield prevents interference from objects on the seat). In one embodiment, due to the provision of a shield electrode, the occupant sensing system may be maintained in the same sensing configuration for sensing objects above the seat while the shield prevents the system from sensing of objects below the sensing electrode. A capacitive sensing occupant classification system may use the measurements obtained from a sensing electrode to classify the occupant of a vehicle seat, and to determine whether to remind the occupant to buckle their seat belt.

According to other exemplary embodiments, a sensing system may use multiple electrodes on opposite sides of a thick piece of foam or any other elastomeric spacer. The electrodes themselves may be, without limitation, copper plates of appropriate thickness, e.g., copper tape. Measurements may be made while the electrodes are in various configurations. According to still other exemplary embodiments, a sensing system may combine or integrate weight sensing concepts with capacitive sensing concepts into a single system. The integrated system may use weight pressure information along with capacitive information to identify the occupant situation and produce a preferred classification.

Each of the electrodes in the seat back and seat bottom may be incorporated into a sensor pad or any other support structure as shown in FIG. 8. The sensor pad may include a layered structure. The sensor pad and sensing electrode may be constructed in a variety of ways, and the method of construction is not considered limiting. For example, the sensor pad may be constructed using a rigid or a flexible circuit board using known printed circuit board techniques such as etching or deposition of conductive materials applied to a dielectric substrate. Alternately, the sensor pad may be the foam cushion or seat pad itself with a discrete conductor, such as a conductive film, sheet or mesh, as the sensing element As described above, the sensing electrode may function as the seat heating element so as to provide a comfortable seating environment for the occupant. If heating is included, a temperature sensor may be disposed near an output of the heating element, which may be used for controlling the temperature of the seat. The controller may include a temperature controller that incorporates a temperature measuring circuit which can receive measurements from the temperature sensor to determine the temperature of the sensor pad and a temperature generating circuit which may provide a signal to the heating element in order to control its operation so that a desired temperature of the seat can be maintained in a closed-loop process. The sensor pad may further include a shielding electrode for shielding the sensing electrode from interference from surrounding conductive components.

According to various exemplary embodiments, a sensing system may use electronic methods for making capacitive measurements (e.g., using high frequency current measurements or other methods). The sensor assembly materials may include any type of conductive material for the electrodes (e.g., copper, conductive inks, conductive fabrics, etc.) and any compressible material for the spacer between the sensor and the shield (e.g., non-woven felts, woven materials, foams, polymers, dielectrics, materials used to allow air flow for forced air climate control seats, or any other material that will significantly compress at pressures under 1 psi).

Referring generally to the figures, an occupant classification system is described that uses a sensor (e.g., a capacitive vehicle sensor) to detect seat occupancy and to detect a weight on the seat. The occupant classification system may generally include a sensor and a shield. For one embodiment accomplishing occupant sensing, the sensor may be oriented above the shield to reduce the influence that objects located under the shield (e.g., a seat heater) have on sensor measurements. The classification system may include a weight or force sensing capability. When sensing the weight, the sensor and shield may switch orientations (e.g., via electronic switching) with the sensor oriented below the shield to reduce the influence objects placed on top of the seat (e.g., electronic devices) have on sensor measurements. The occupant sensing and weight or force sensing measurements may be used together to determine whether an object on the seat is a person and may reduce the false detection of objects as people.

Referring to FIG. 1, a vehicle 10 is shown with an occupant 12 in a seat 14 of the vehicle 10, according to an exemplary embodiment. The seat 14 may include an occupant classification and detection system 16. As shown in FIG. 1, the occupant classification system 16 may generally be located in the seat 14 below the area in which an occupant 12 of the vehicle 10 sits, or may be located in other areas of the seat 14 or vehicle 10.

The occupant classification system 16 may generally include a sensor, a shield, and electronics for sensing and classifying the occupancy of the seat 14. For example, the sensor may be used to provide measurements that correspond to the effect of an object on the sensor due to both the conductivity and weight of the object. Measurements from the sensor may be evaluated to determine the existence of an object or occupant in the seat 14. The occupant classification system 16 may include or be configured to operate in conjunction with a seat heating system and/or other systems for the seat 14 of the vehicle 10.

The occupant classification system 16 includes a capacitive or electric field sensor that includes a sensing electrode. The capacitive sensor may generally be capable of sensing properties such as a proximity, position, or weight of an object, or the like. Various measurements from the sensing electrode may be used to detect the presence of an object in the seat. For example, the system may measure the change in capacitance (e.g., changes in an electrical property between two conductive objects). As an occupant 12 sits on seat 14, the system may detect a capacitance change to determine the presence of the occupant 12 by the occupant classification system 16.

According to one embodiment, as shown in FIG. 2A, a capacitive based occupant classification system 200 includes an upper planar electrode 202 and a lower planar electrode 204. In the embodiment of FIG. 2A, the upper planar electrode 202 is a sensing electrode 202 and the lower planar electrode 204 is a shield electrode. During a typical or normal measurement mode or configuration, the system 200 detects changes in the signal from the sensing electrode— the upper planar electrode 202 closest to an occupant 206 to determine whether an occupant is present. The shield electrode (i.e., for this embodiment, the lower planar electrode 204) is located below the upper planar electrode (or sensing electrode for this embodiment) in a vehicle seat. The sensing electrode and the shield electrode may be changed to different configurations to measure the force on the surface of the seat.

Referring to FIG. 2B, in one exemplary embodiment, the role or function of the sensing electrode and the shield electrode may be switched when the occupant classification and detection system is operated in a force or weight measurement mode. In the weight measurement mode, the system 200 may be configured to be less sensitive to the presence of the occupant and may be used to determine the weight of the occupant 206. During the weight measurement mode, capacitive or electric field sensing is performed using the measurements obtained from the lower electrode 204 furthest from the occupant (the shield electrode in the occupant sensing measurement) and the upper electrode 202 closest to the occupant 206 is switched to become the shield electrode. The electrodes 202, 204 may be switched using electronic or mechanical switches configured to modify the current flow through the electrodes.

Instead of using the lower sensing electrode to measure the force or weight measurement mode, the system's electronics and/or software may be configured to measure the capacitance (or current or impedance) between the sensor and the shield (the electrodes 202, 204). The measured capacitance (or a measure representative or related to the capacitance or current or impedance) may be compared to a threshold value. A difference between the measured value and the threshold value can be attributed to a change in relative location of the sensors due to a force on the seat. The measurement may be made without being significantly influenced by the conductive or dielectric characteristics of the occupant 206 because the occupant 206 is shielded from the measurement by the upper electrode 202.

Referring to FIG. 2C, as the force on the seat bottom is increased, material 208 between the bottom sensor (electrode 204) and the upper shield (electrode 202) is compressed. This compression causes the electrodes 202, 204 to move closer together causing a corresponding increase in the capacitance between the two electrodes 202, 204. The capacitance between the electrodes 202, 204 (or any other measure that is an indication of the change in relative position between the electrodes 202, 204) may be used to estimate the force on the seat applied by the occupant 206. The force on the seat may be used to differentiate between an occupant (i.e., person) and an inanimate object (e.g., computer).

Other exemplary embodiment of a capacitive or electric field type occupant classification and detection system may be configured in various embodiments. One illustrative system includes an upper electrode and a lower electrode for sensing an occupant. The system further includes electronics (e.g., sensing and signal conditioning electronics) configured to provide current or signals to drive the electrodes and to provide measurements on the electrodes. The occupant classification and detection systems disclosed herein may include a controller, processor or electronic control unit (ECU) that controls the system and receives various measurements from the system components (e.g., the sensing electrodes). The controller is configured to interact with other vehicle systems such as, for example, vehicle safety systems (e.g., airbag and scat belt systems). The controller may provide a signal to a vehicle safety system that indicates whether an adult person is located in the vehicle seat so that safety devices may be activated if appropriate. The controller for the occupant classification system may be integrated with a controller for another vehicle system such as, for example, the controller used for a vehicle safety system.

Figure 2:
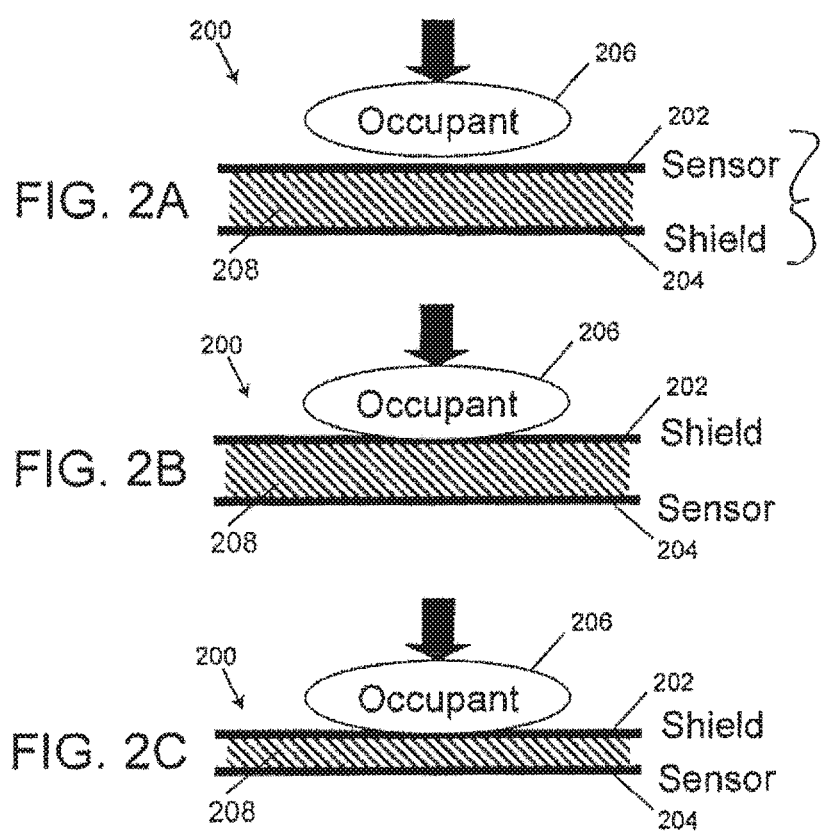
FIGS. 2A-2C are schematic diagrams of a capacitive sensing system, according to exemplary embodiments.
Figure 3:
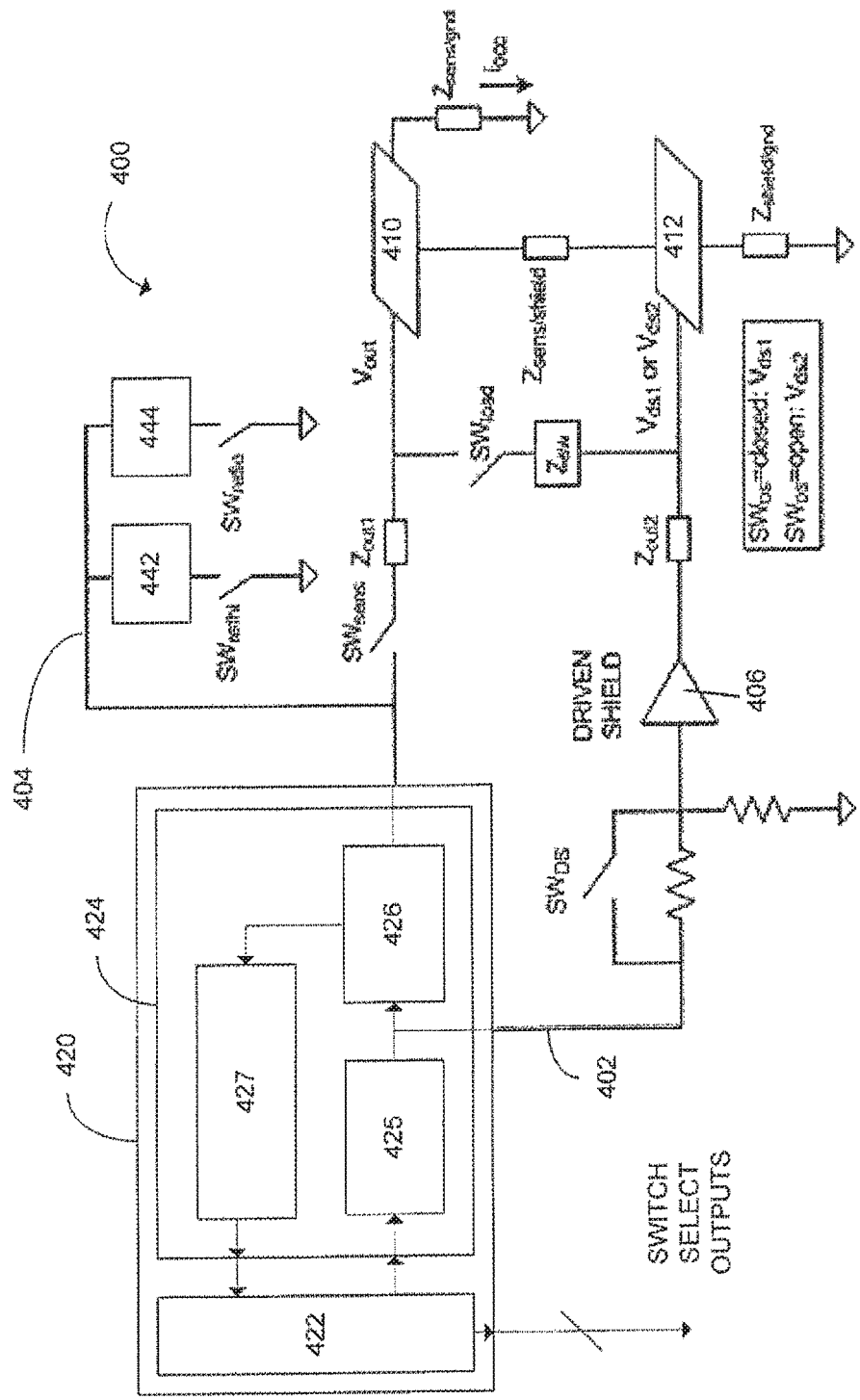
FIG. 3 is a circuit diagram of the occupant detection system according to one exemplary embodiment.

Referring specifically to FIGS. 2 and 3, the system 200, 300 includes an occupant sensing mode or configuration for detecting an occupant 206 while shielding interference from below the system 300, according to one exemplary embodiment.

The system implementing the sensors of FIG. 2 includes at least one switch that electrically couples the upper electrode 202 to a sensing port of the electronics and includes a switch that electrically couples the lower electrode 204 to a shield port of the electronics. In the configuration of FIG. 2A, the upper electrode 202 is the sensing electrode and the lower electrode 204 is the shield electrode.

Referring now to FIG. 2B, the system may also include a weight or force sensing mode or configuration that reduces sensitivity to electrical properties of the occupant 206 and may be used for determining the weight of the occupant 206, according to one exemplary embodiment. In one non-limiting embodiment, the conductor or upper electrode 202 near the occupant 206 is switched to ground and the conductor or lower electrode 204 away from the occupant 206 is switched to the sensing port of the electronics. The upper electrode 202 is then the shield electrode and the lower electrode 204 is the sensing electrode.

Figure 4:
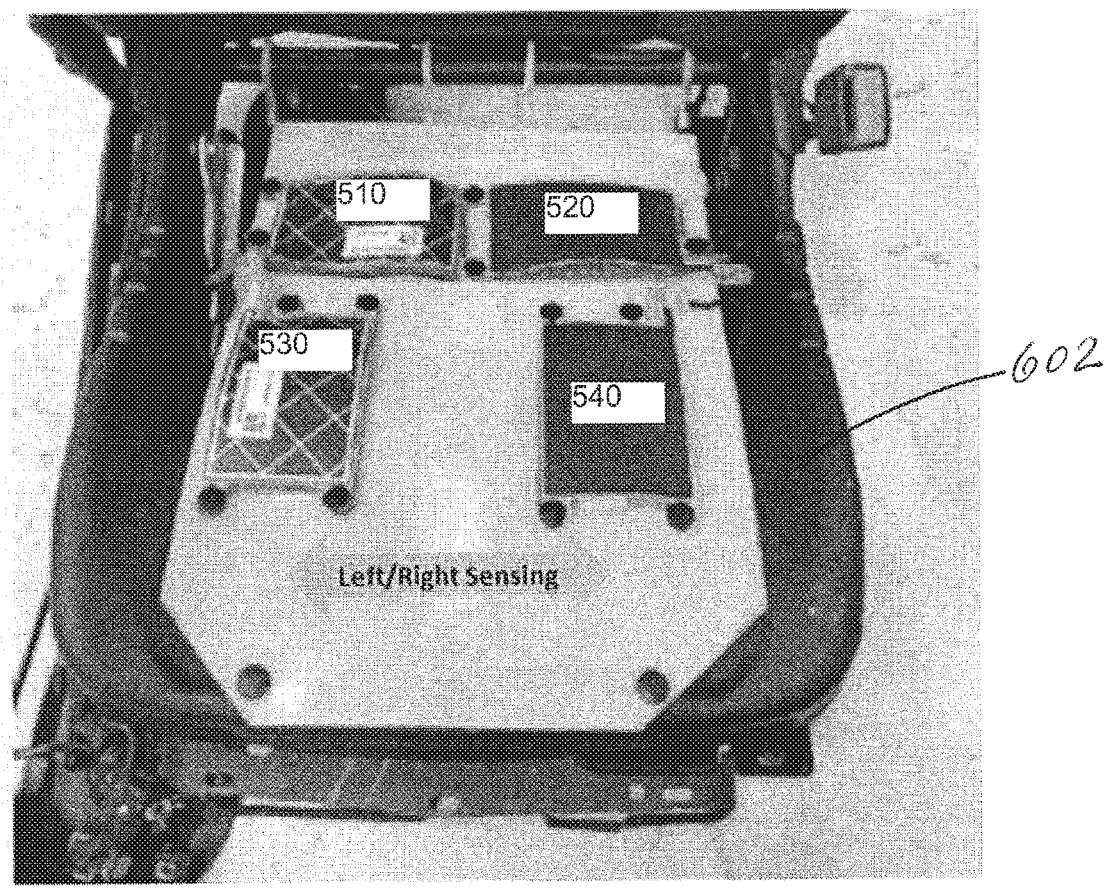
FIG. 4 is a schematic of a multi-zone occupant classification sensor arrangement as disclosed herein.

The electronics, as shown in FIG. 4, employed by the system may be software and any analog or digital circuitry capable of controlling the occupant classification system. Also, according to various exemplary embodiments, the switches may be any electronic or mechanically actuated switches capable of modifying a flow of electrical current. The electronics may be configured to control the switching of the switches. For example, the system may generally be in an occupant sensing configuration and only switch to a weight sensing configuration for verification if the sensing configuration determined the occupant to be of adult size. Alternatively, the switching may occur periodically at a time interval.

The addition of a weight or force measurement to the electric field or capacitive measurement allows the system to separate or discriminate between cases where an object may look large (e.g. appear like an adult) to the capacitive sensing system 200, 300, but is physically small. For example, capacitive loading or electrical interference generated by electronic devices on the scat, especially when those devices are plugged into the 12 volt accessory plug in the vehicle, may cause an increase in measured capacitance when the sensing node is positioned above the shield node. Such electronic devices may include cellular phones, smart phones, personal digital assistants (PDAs), global positioning systems (GPS), optical disc (e.g., DVD, Blu-Ray, etc.) players, laptop computers, or any other electronic device. Electronic devices may appear large to the capacitive sensor because they are conductors and are well coupled to ground. Recognizing electronic devices or other objects on the seat incorrectly as adults may cause an annoyance when the vehicle seat belt reminder turns on. The exemplary embodiments described above solve the annoyance issue by integrating a low cost force measurement into a capacitive sensing system. The weight sensing configuration may also be used to identify the empty seat and diagnose problems with the capacitive sensing system and the same measurement electronics and connections out to the sensor may be used for the weight measurement and the capacitive measurement, resulting in a low cost solution.

The exemplary embodiments of FIGS. 2 and 3 may use any configuration of electrodes where the change in relative physical location of the sensor to shield is measured electronically and is not influenced significantly by the conductive or dielectric characteristics of the occupant. According to alternative exemplary embodiments, instead of detecting the capacitance between the sensor and shield electrodes, the system may use multiple measurements in multiple configurations to calculate a high frequency (e.g., about 100 kHz, greater than 100 kHz, etc.) AC current flowing only between the sensor and shield. A significant increase in that measured current indicates an increase in the sensor to shield capacitance, which indicates a change in relative position of the sensor and shield due to an increased force from the occupant. According to other examples, the capacitance between the sensor and shield electrodes may be measured by analyzing a change in an RC time constant, a change in a response of the system to a step voltage to the electrodes, a change in charge sharing between the electrodes, or any other method of measuring capacitance.

FIG. 3 depicts a representative or exemplary circuit diagram of an occupant detection system 400 according to one exemplary embodiment. The occupant detection system 400 includes a sensing circuit 402 electrically connecting the sensing electrode 410, the shield electrode 412, switches $SW_{DS}$ and $SW_{load}$, and electronics 420. The sensing circuit 402 may also include a signal producing device 406, such as an amplifier or transistor, disposed between electronics 420 and the shield electrode 412. The sensing electrode 410 may also include a conductor, sensing node, or other device, such as an inductor, disposed outside the electronics 420. The shield electrode 412 may also include a conductor or other device, such as a shield node, disposed between the shield electrode 412 and signal producing device 406. While the sensing circuit 402 is shown outside the electronics 420, the electronics 420 may include components of the sensing circuit 402, such as switches, amplifiers, or other devices. For example, the electronics 420 and components of the sensing circuit 402 may be integral, disposed in a common housing, or on a common circuit board, while the sensing and shield electrodes 410, 412 are external to the housing and electrically coupled to the electronics 420. Those skilled in the art, however, will recognize that other configurations are possible according to other embodiments.

The electronics 420 generally include a controller 422 and a signal conditioning device 424. Other components may include another processor, microcontroller, and associated memory. The signal conditioning device 424 generally includes a sine wave output device 425, a current sense circuitry 426, and a demodulation and filtering device 427.

The signal conditioning device 424 produces an output signal, measures current, and produces an input signal corresponding to the measured current.

The controller 422 may be a microprocessor or electronic control unit (ECU) and controls the occupant detection system 400. The controller 422 determines when the signal conditioning device 424 produces an output signal, opens and closes the switches $SW_{DS}$ and $SW_{load}$, and interprets the input signal received from signal conditioning device As described further below, the system 400 may be operated to obtain certain measurements that may be used to obtain a representative indication of the force on the vehicle seat, such as when the occupant's weight forces the sensing electrode 410 toward the shield electrode 412. The electronics 420 are used to calculate the impedance between the sensing electrode 410 and shield electrode 412, which can be used to classify the occupant. The electronics 420 may also be used to calculate the impedance between the sensing electrode 410 and ground, which can be used to detect an occupant. The electronics 420 may also be used to calculate the impedances between the sensing electrode 410 and both the shield electrode 412 and ground to both detect and classify an occupant.

The controller 422 may be a microprocessor or electronic control unit (ECU) and controls the occupant detection system 400. The controller 422 determines when the signal conditioning device 424 produces an output signal, opens and closes the switches $SW_{DS}$ and $SW_{load}$, and interprets the input signal received from signal conditioning device 424.

By opening and closing the switches $SW_{DS}$ and $SW_{load}$, the sensing circuit 402 of the occupant detection system 400 may be placed in four different configurations (i.e., switches $SW_{DS}$ and $SW_{load}$, respectively, are closed/open, closed/closed, open/open, and open/closed). Closing $SW_{DS}$ changes the amplitude of the output signal on the shield electrode 412, and closing $SW_{load}$ introduces an impedance $Z_{sw}$ between the sensor and shield electrodes 410, 412.

In each of the four circuit configurations, current is measured by the signal conditioning device 424, thus providing four current measurements $M_1$, $M_2$, $M_3$ and $M_4$. $M_1$ is measured when $SW_{DS}$ is closed and $SW_{load}$ is open, $M_2$ is measured when $SW_{DS}$ is closed and SW load is closed, $M_3$ is measured when $SW_{DS}$ is open and $SW_{load}$ is open, and $M_4$ is measured when $SW_{DS}$ is open and $SW_{load}$ is closed.

From these four current measurements, a number proportional to the impedance between the sensing electrode 410 and shield electrode 412 (i.e., a force value) is calculated by the controller 422 as follows:

$$\frac{-Z_{sensor/shield}}{Z_{SW}} = \left(\frac{M_4 - M_2 - M_3 + M_1}{M_1 - M_3}\right)$$

This equation is derived from the following equations:

$$M_1 = \left(\frac{V_{out} - V_{ds1}}{Z_{sensor/shield}} + \frac{V_{out}}{Z_{sensor/ground}}\right)$$

$$M_2 = \left(\frac{V_{out} - V_{ds1}}{Z_{sensor/shield}} + \frac{V_{out}}{Z_{sensor/ground}} + \frac{V_{out} - V_{ds1}}{Z_{SW}}\right)$$

$$M_3 = \left(\frac{V_{out} - V_{ds2}}{Z_{sensor/shield}} + \frac{V_{out}}{Z_{sensor/ground}}\right)$$

$$M_4 = \left(\frac{V_{out} - V_{ds2}}{Z_{sensor/shield}} + \frac{V_{out}}{Z_{sensor/ground}} + \frac{V_{out} - V_{ds2}}{Z_{SW}}\right)$$

The number—Zsensor/shield/Zsw—thus, is proportional to the impedance between the sensing electrode 410 and the shield electrode 412 and may be used to determine the relative force on the vehicle seat in order to classify the occupant. The resulting occupant classification may be used, for example, to determine whether the seatbelt reminder should be turned on or whether an airbag should deploy.

From current measurements M1, M2, M3, and M4, a number corresponding to the impedance between the sensing electrode 410 and ground (i.e., a detection value) may also be calculated as follows: This equation is derived from the following equations:

$$i_{occ} = \frac{(M_1 \times M_4) - (M_2 \times M_3)}{M_1 + M_4 - M_2 - M_3}$$

This equation is derived from the following equations:

$$M_1 = i_{occ} + \left(\frac{1 - V_{ds1}}{Z_{sensor/shield}}\right)$$

$$M_2 = i_{occ} + \left(\frac{1 - V_{ds1}}{Z_{sensor/shield}}\right) + \left(\frac{1 - V_{ds1}}{Z_{SW}}\right)$$

$$M_3 = i_{occ} + \left(\frac{1 - V_{ds2}}{Z_{sensor/shield}}\right)$$

$$M_4 = i_{occ} + \left(\frac{1 - V_{ds12}}{Z_{sensor/shield}}\right) + \left(\frac{1 - V_{ds2}}{Z_{SW}}\right)$$

where Zsw is cancelled out and need not be known, but should be large enough to meaningfully change the calculations, and $Z_{sensor/shield}$ is derived from the equation for $$\frac{-Z_{sensor/shield}}{Z_{SW}}$$

above. The value for $i_{occ}$ corresponds to (i.e., is inversely proportional to) the impedance between the sensing electrode 410 and ground and may be used to determine the presence of the occupant or an object (i.e., detect an occupant).

According to one exemplary embodiment, the occupant detection system may also include a normalization circuit 404. The normalization circuit 404 enables the electronics 420 to adjust for measurement variations due changes in gain, offset shift and phase shift in the sensing circuit 402.

The normalization circuit 404 includes a high reference impedance device 442 and a low reference impedance device 444, each having a different, known impedance. Corresponding switches SWrefhi and SWreflo selectively connect the high and low reference impedance devices 442, 444, respectively, to ground. The signal conditioning device 424 produces a 100 kHz AC current, as an example, at constant voltage and measures reference currents $M_{refhi}$ and $M_{reflo}$; Reference current $M_{refhi}$ is measured when $W_{refhi}$ is closed and $SW_{reflo}$ is open, and reference current $M_{reflo}$ is measured when $SW_{refhi}$ is open and $SW_{reflo}$ is closed.

The sensing circuit 402 is provided with a switch $SW_{sens}$ to isolate the sensing circuit 402 and normalization circuit 404. When current measurements M1, M2, M3, and M4 are taken, $SW_{sens}$ is closed. When reference currents $M_{refhi}$ and $M_{reflo}$ are taken, $SW_{sens}$ is open, thus isolating the normalization circuit 404 from the sensing circuit 402.

By measuring reference currents $M_{refhi}$ and $M_{reflo}$ with respect to impedance devices 442, 444 of known impedance and isolating the normalization circuit 404 from the sensing circuit 402, the microprocessor 422 may calculate system impedance independent of the sensing circuit 402. In this manner, the microprocessor 422 may account for changes in gain, offset shift and phase shift in the sensing circuit 402 more accurately detect and classify the occupant.

In one embodiment, the hardware in an occupant classification system uses inductive properties of the sensors to take advantage of physical effects induced in the sensors by an occupant on a vehicle seat. When conductive material, such as the opposite plate of the overall sensor, approaches an active face of the appropriate electrically conductive sensing plate, the distance to the active face at which an electrically conductive plate is positioned causes a change of signal in the sensor (i.e., the sensing range).

In another way of describing the system, the system measures a property such as the loading current (or impedance) to ground from the sensing element by monitoring the voltage signal provided to the sensing conductor or element. This measurement may utilize a signal or property of measure that is representative of the desired property to be measured (i.e., impedance or current). For this measurement, a human occupant has a low impedance to ground while an empty seat or a seat with an object resting upon it (e.g. a purse, backpack, briefcase, groceries, child safety seat, etc.) has a high impedance to ground. The occupant classification system may utilize this measurement to provide input to other vehicle systems, such as an airbag system or a seat belt reminder (SBR) system. For example, if the occupant classification system detects a low impedance from the seat bottom sensor indicating an adult occupant, it may instruct the airbag system to activate one or more airbags associated with the seat in a collision. If however, the occupant classification system detects a high impedance from the seat bottom sensor, it may instruct the airbag system to deactivate one or more airbags associated with the seat in a collision, as the high impedance measurement may be interpreted as an empty seat or a seat containing an object such as child safety seat.

According to various exemplary embodiments, the shield may be driven with any potential or signal that is compatible with the measurement concepts and the associated electronics hardware. For example, the shield may be driven with a signal that is similar to or the same as the sensor signal, may be connected to a fixed DC level, or may be driven with various signals to enable the multiple measurement concept mentioned above. The time varying voltage applied to the sensor could take many shapes, although a preferred shape is a sinusoidal signal at frequencies between about 50 kHz and about 150 kHz. This loading current increases significantly when an adult occupant is on the seat and only slightly when there is a child seat on the vehicle seat.

The sensing system may utilize a measurement system that measures the in-phase (I) and quadrature (Q) components of the current supplied to the sensing electrode via voltage signal. With such a measurement system, separation remains between the adult and the RFIS/wet seat situation. Thus, the sensor system can distinguish between an adult and a RFIS (Rear Facing Infant Seat) on the seat in both normal and wet seat situations. Using the I and Q measurements, seal the sensing electrodes from direct contact with the wet seat foam of the vehicle seat, and ensure that the seat structure is grounded to allow separation between the RFIS/wet seat and normally seated adult cases.

Although the occupant classification system 200, 300 is illustrated as including multiple features utilized in conjunction with one another, the system 200, 300 may alternatively utilize more or less than all of the noted mechanisms or features. For example, in other exemplary embodiments, the more electrodes may be used in the system 200, 300.

Although specific shapes of each element have been set forth in the drawings, each element may be of any other shape that facilitates the function to be performed by that element. For example, the electrodes have been shown to be planar electrodes, however, in other exemplary embodiments the structure may define electrodes of other shapes. Further, while a specific form of switches has been shown in FIG. 4, according to other exemplary embodiments, the switches may be in other forms or actuate in different directions. The sensing and classification system described in detail above, may be employed with existing occupant detection systems such as those described in U.S. patent application Ser. No. 12/541,825. The foregoing patent application is incorporated by reference herein in its entirety.

The sensing system can use both the I and Q measurements measured by a current measurement circuit, which sends the I and Q measurements to a microprocessor to make a classification of the occupant during wet seat situations because the nature of the impedance to ground changes when the seat is wet. Without using both I and Q, there would be overlap between the RFIS (infant cases) and small adults (the "standard small adult" are referred to as "5th %" cases, which are occupants approximately 108 lbs.). Both the I and Q measurements are used in order to recognize separation between the RFIS cases and the small adult cases.

As an alternative, I and Q measurements need not be made. Instead, for example, the phase and amplitude of the current sent to the sensing electrode could be measured to gain equivalent information. According to an embodiment, the impedance from the sensing electrode to ground should be characterized such that capacitive components of the impedance affect the measurement differently than the resistive components of the impedance. Once the I and Q measurements/values (or other appropriate measurements) are obtained, a corresponding measured signal is provided to a controller or microprocessor preferably located in the ECU of the occupant classification system. The controller may be configured to make an occupant classification determination (see, e.g., FIGS. 6, 10, 11).

Also, for the voltage signal to the sensing electrode, time varying shapes may be used that are not sinusoidal signals. If this is the case, alternative methods of identifying the characteristics of the impedance could be used. For example, square pulses could be sent out to the sensing electrode. The current sent out to the sensing electrode could be measured and characteristics such as the peak and rise time of the current pulse could be used to characterize the sensing electrode's impedance to ground. Alternatively, several pulses of different length could be sent out to the sensing electrode. Characteristics of the impedance could be derived by analyzing the relationship between the peak currents and the variation of the current with pulse length. In general, the principles of operation of the capacitive (i.e., electric field) sensor described herein can be the same as described in U.S. Patent Publication No. 2007/0192007, the entirety of which is incorporated by reference herein.

The seat bottom sensor, however, may detect a false positive if the object on the seat is a grounded conductive object that may have a low impedance to ground and cannot be discriminated from an adult occupant of the seat (e.g., a laptop computer, a portable DVD player, etc.) This may cause unintended actions by other vehicle systems, such as causing the SBR system to sound a buzzer or provide another signal when a conductive object is placed on the seat.

An occupant classification system controller, mentioned above, may employ the logic shown in FIG. 3 to determine the classification of the occupant or make a determination whether an occupant is present. The controller may provide an appropriate signal to other vehicle systems such as the SBR system. The controller and ECU may communicate with these other vehicle systems via the vehicle local area network (LAN). The ECU may be connected to the LAN via a conductive line. In FIG. 3, the state of vehicle sensor being on may correspond to a measurement signal indicating the presence of an occupant in the seat. Thus, other systems, such as seat belt systems should only be activated when both the seat bottom sensor and seat back sensor provide signals indicating the present of an occupant.

In another exemplary embodiment, the occupant classification system may utilize a force sensitive resistor (FSR) in the seat bottom in addition to or instead of an electric field sensor in the seat back. The FSR may be integrated into the seat bottom sensor or may be provided separately from the seat bottom sensor (e.g., coupled to the top or bottom surface of the sensor). The resistance of the FSR varies in relation to the downward force being applied to the seat bottom. A resistance caused by a threshold force being applied to the seat bottom may be determined and the resistance of the FSR may therefore be used to determine if the seat is occupied by an adult applying a relatively high force to the FSR or by an object with a low impedance to ground but applying a relatively low force to the FSR.

A control algorithm divides the data from the seat bottom heater into two regions to determine occupant classification; the first region indicating that the status is empty or small and the second region indicating that the status is either large or occupied.

The Occupant Classification System disclosed herein is also amenable for combining with ALR (automatic locking retractor) and ELR (emergency locking retractor) technology for additional control systems. The ALR retractor is one of the seatbelt retracting devices, and is also called as an automatic locking safety belt retractor. This is constructed in such a manner that when a predetermined amount of seatbelt is unwound, the rotation of the winding mechanism in the direction in which the seatbelt is unwound is locked and thus further unwinding operation is prevented while allowing only winding operation. The ELR retractor with ALR switch function is for example the one disclosed in Japanese Examined Utility Model Publication No. 4-15557 (incorporated by reference herein in its entirety), which is constructed in such a manner that it works as a normal emergency locking safety belt retractor (ELR) until the seatbelt is unwound by a predetermined amount, and when the seat belt is unwound by a predetermined amount, it works as an ALR retractor. An ELR includes an inertia reel in which any sudden movement of the seat belt locks an associated retractor. The ALR (automatic locking retractor), on the other hand, locks the seat belt at a set position.

Both types of the seatbelt retractors have a mechanism for detecting that the seatbelt is unwound by a predetermined amount (normally full amount or near full amount) and for locking further unwinding operation thereof. Therefore, by providing a limit switch to the locking mechanism and using it as a seatbelt extraction amount sensor, the mechanism of the seatbelt extraction amount sensor can be simplified. This associated seat belt technology is a source of additional control data that can provide According to another embodiment of the present invention, an occupant sensor is provided. The sensor is arranged according to any one of the first to third embodiments mentioned above and is configured so that the seatbelt extraction amount sensor is an ALR switch sensor of the ELR retractor with ALR switch function.

The ELR retractor with ALR switch function works as an normal emergency locking safety belt retractor (ELR) till the seatbelt is unwound by a predetermined amount, and works as an automatic locking safety belt retractor (ALR) once the seatbelt is unwound by a predetermined amount. In this ALR state, further unwinding operation is locked and only winding operation is possible. In case an ALR switch sensor for detecting that the seatbelt is unwound by the predetermined amount is employed, the sensor can be used as a seatbelt extraction amount sensor, even if no particular extraction amount sensor is employed.

One goal of the embodiments disclosed herein is to establish combinations of data values that are conveniently combinable to improve the safety performance of vehicle systems. In particular, the occupant classification system of this disclosure uses data from multiple occupant classification sensors ("OC sensors"), shown by way of non-limiting examples as OC sensors 510, 520, 530 and 540 in FIG. 4. Each of these OC sensors is configured to provide an output signal to a controller, or other microprocessor, via a respective sensing circuit 402 to assess a physical characteristic of an occupant in a vehicle seat or the lack of an occupant in the vehicle seat. The OC sensors may be strategically placed in the vehicle seats' construction within previously identified zones to provide more than one output signal for comparison purposes, for statistical analysis, and to control other systems in the vehicle pursuant to safety regulations. In one embodiment, the zones of a vehicle seat may be relative to seat axes running across a vehicle seat surface. In one embodiment, a first axis laterally extends across a vehicle seat from a left edge of the seat bottom to a right edge of the seat bottom (i.e., left and right designations are synonymous with edges of the vehicle seat facing respective vehicle doors for occupant entry). Another axis may include a center line extending from a front edge to a rear edge of the seat bottom (i.e., front and rear designations are synonymous with seat edges facing a front hood and a rear trunk of the vehicle). In these embodiments, the OC sensors may be placed in the seat bottom to correspond to the quadrants (or other divisions) of the seat surface established by these axes. Multiple axes and multiple shapes for each zone are well within the scope of this disclosure. Other areas of the seat structure may be established for OC sensor placement as well, including positions along the sides and back of a vehicle seat or the front and rear regions of a vehicle seat or vehicle seat base.

Overall, as noted above, placing multiple OC sensors in the vehicle seat provides opportunities to utilize the data provided by each OC sensor to define improved threshold boundaries for each classification necessary to identify the physical characteristics of an occupant in the seat. The occupant classification system set forth in this disclosure is particularly adapted to utilize threshold boundaries that have been absent from systems of the prior art. Notably, OC sensors may be utilized to establish threshold boundaries separating an empty or infant occupant of a vehicle seat from a 6 year old child in the seat, separating a 6 year old child classification from a $5^{th}$ percentile weight adult female classification, and separating a $5^{th}$ percentile weight adult female classification from a $50^{th}$ percentile weight adult male classification.

In general, and without limiting the scope of the embodiments of this disclosure, the current standards for occupant classifications include a 5th percentile adult female classification, which includes occupants having a weight of between 85 to 120 pounds; occupant classifications for a $50^{th}$ percentile male classification includes occupants having a weight of between 130 and 190 pounds. The system shown herein may also distinguish between a first child classification, which includes occupants having a weight of less than 20 pounds, a second child classification, which includes occupants having a weight of between 20 and 40 pounds, and a third child classification, which includes occupants having a weight of between 40 and 60 pounds.

With one goal of the embodiments of this disclosure being to establish higher resolution thresholds between occupant classifications, an occupant classification system may be configured to use pairs of occupant classification sensors 510, 520 (again, the "OC sensors") in numerous combinations to identify a vehicle occupant by a proper weight classification. Identifying the occupant with output from more than one OC sensor helps to minimize confusion between small adults and children and confusion between small adults and slightly larger adults whose weight lies between a $5^{th}$ percentile female and $50^{th}$ percentile male. The system is also better prepared to minimize any confusion between an occupant and conductive items on a vehicle seat (i.e., cell phones, computers, GPS accessories, and the like) that may change the electrical current response, such as capacitive or induction readings on a sensor in the vehicle seat.

FIG. 5 included herein illustrates one example of how the multiple OC sensors 510, 520, 530, 540 may be utilized with a processor, controller, respective sensing circuits and associated computerized memory to provide numerous threshold boundaries for an occupant classification system. As shown in FIG. 5, at least one pair of the OC sensors can send respective output signals to a controller, indicative of a change in electrical current or electrical current characteristics on a respective electrode in the OC sensor. The change in current may be indicative of an inductance value for the electrode and may be plotted in a coordinate system, such as (but not limited to) the Cartesian coordinates of FIG. 5.

Before using the occupant classification system in a vehicle, the threshold boundaries for the preferred occupant classifications are established with live test subjects and a plurality of output signals from numerous OC sensors. In the example shown, and without limiting the embodiments to any one theory of operation, the test data for live subjects is plotted with an output signal value (or representative inductance value calculated for a respective OC sensor from the output signal) along respectively assigned x and y axes for each respective OC sensor output. The test data is calibrated so that each test occupant's known weight is associated with the coordinate system used to plot the test data (i.e., inductance values for each respective OC sensor along the x and y axes). By statistically analyzing the test data and the associated relations to threshold boundaries established by threshold data, the system described herein can use the threshold boundaries to calculate an occupant as fitting within a particular classification (infant or carrier seat, 6 year old child occupant versus $5^{th}$ percentile weight adult female occupant (boundary 600), and larger female versus $50^{th}$ percentile weight adult male (boundary 605)) may be established. In one non-limiting example, the threshold boundaries for each classification may be determined by midpoint or statistical mean analysis to plot the classification threshold boundaries in a classification system between the statistically significant test data points for various weights. The threshold boundaries may include tolerance levels, specified for any given application, to move the threshold boundary in one direction or another, thereby adjusting the occupant classification scope and resolution. Accordingly, the threshold boundaries are customizable for particular applications.

Upon customization of the threshold boundaries from live test data, as shown in FIG. 5, the OC sensors 510, 520, 530, and 540 each provide output signals to the controller that quantifies an electrical signal response present at that OC sensor in a respective zone of the vehicle seat. In the example of FIG. 5, each quantified electrical response (e.g., the quadrature component of a sensing current at a particular electrode in one of the OC sensors as shown in FIG. 6) can be plotted as a coordinate in a coordinate pair on the same coordinate system as the threshold boundaries. In this way, the system described herein is scalable in a way that other previously used occupant classification systems have not been.

Using pairs of OC sensors in selected zones of a vehicle seat structure allows for weighting of the zoned output signals emanating from each OC sensor in statistically significant ways determined empirically for particular applications. The output signals, bearing digitally recordable identification as emanating from one of the selected OC sensors in one of the selected zones, allows for not only higher resolution in occupant classification but also exponentially more combinations of data points to adjust other vehicle systems, particularly air bag deployment and seat belt signaling.

In regard to air bag deployment, the kind and magnitude of OC sensor output signals yields greater control over deployment strategies for air bags, seat belts, and other systems in the vehicle. In regard to air bags, the zoned OC sensor analysis gives more meaning to selections of whether a given occupant in a vehicle should be subject to degrees of air bag suppression, low risk air bag deployment, and tailored air bag deployment that is most suitable for the occupant who has been properly classified with a better weight estimate.

FIG. 5 illustrates just one coordinate system in which threshold boundary data 600, 605 may be compared against OC sensor data. In the example of FIG. 4, a pair of OC sensors oriented left to right (e.g., 530, 540 or 510, 520) each provide the Q value (quadrature component of a sensed current value) to one axis in the coordinate system. This representation in FIG. 5 is merely an example for ease of explanation, and an occupant classification system may compare the data in computerized hardware without actually compiling an x and y axis plot. Statistical and data processing techniques may also be used to compile OC sensor data into multi-dimensional coordinate systems, multi-dimensional tables, computerized registers, and numerous other coordinate systems used to track and compare data points in a computerized system. Accordingly, it is well within the scope of the occupant classification system disclosed herein for computer hardware (processors, controllers, memory, graphics cards, and the like) to overlay data from many OC sensors and many pairs of OC sensors into one overall coordinate system to accomplish the objectives. The term "coordinate system," therefore, is not limited to graphical coordinates but may be represented in any computerized form subject to statistical and data processing techniques.

An exemplary set of computer hardware that may be useful in association with this disclosure is also shown in FIG. 3.

Figure 6B:
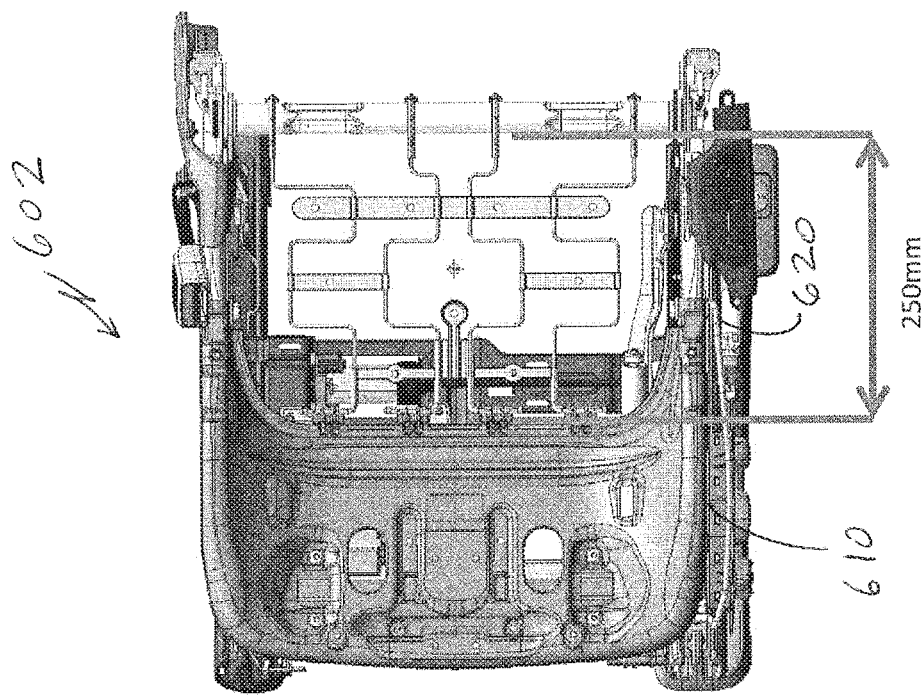
FIG. 6B is a schematic illustration of a vehicle seat similar to FIG. 6A and illustrating usable space in the vehicle seat base for an occupant classification system as described herein.
Figure 6A:
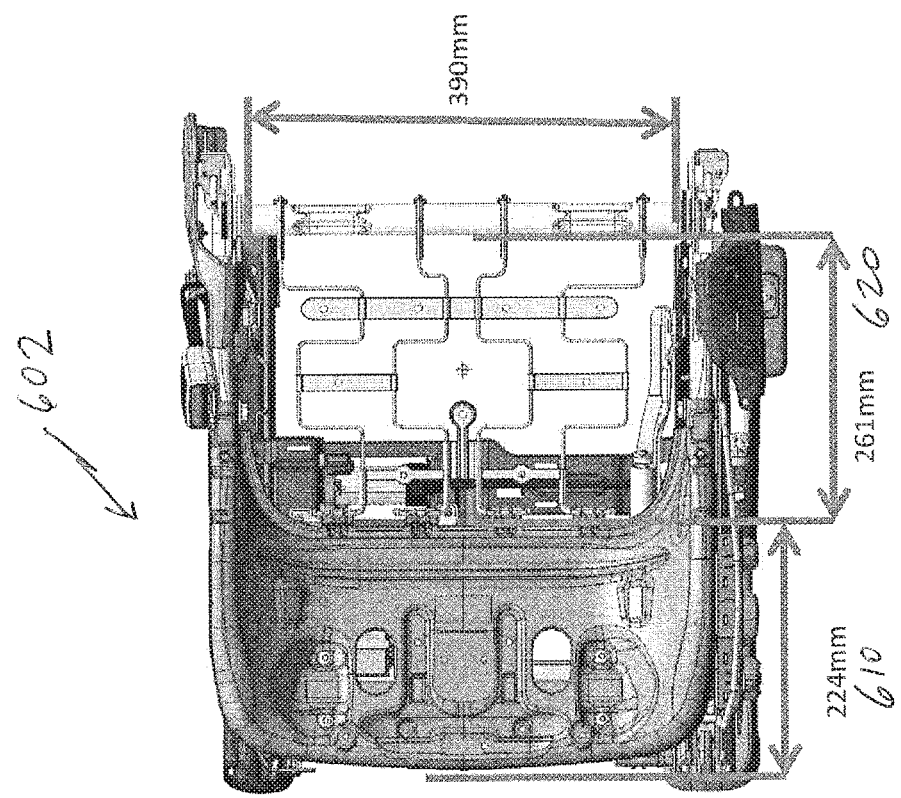
FIG. 6A is a schematic illustration of a vehicle seat base having a front pan region and a rear springs region according to embodiments of this invention.
Figure 7:
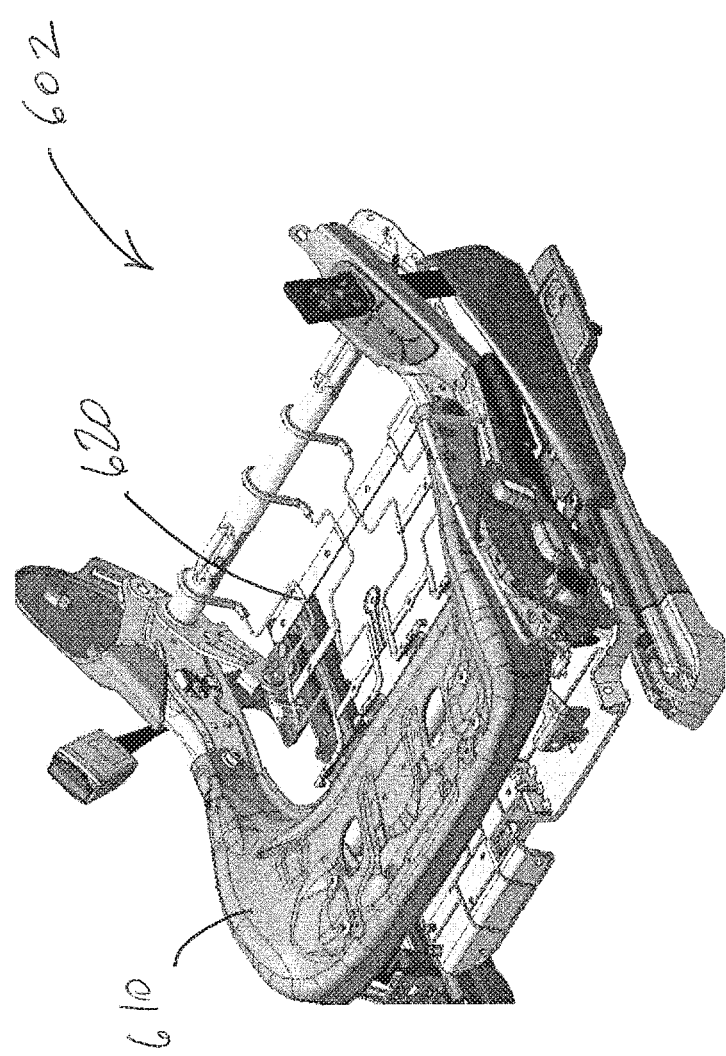
FIG. 7 is a schematic illustration of a perspective view of the vehicle seat base of FIG. 6A.
Figure 9A:
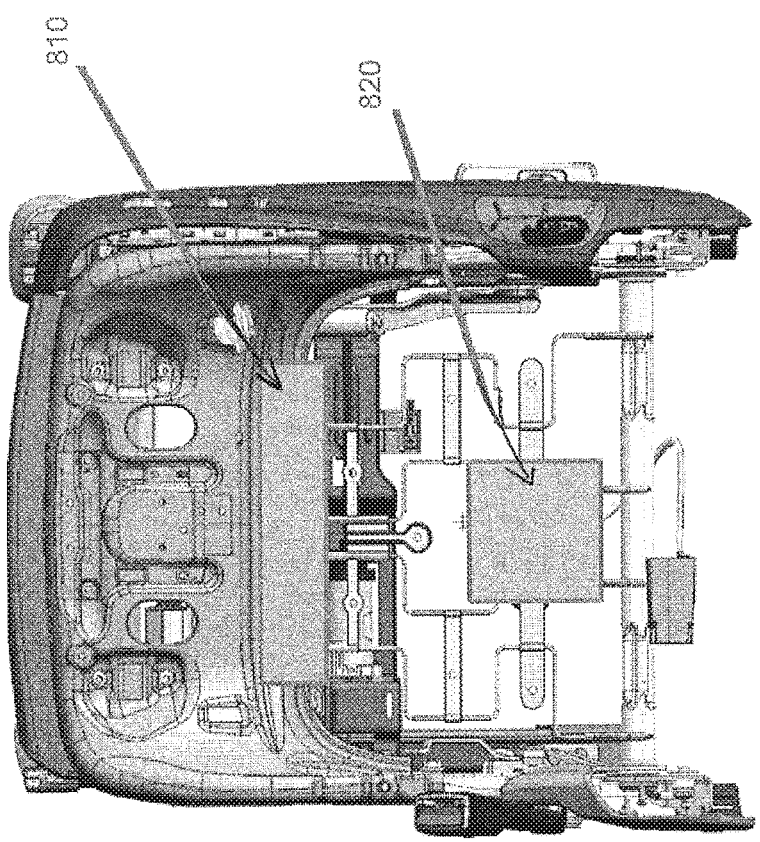
FIG. 9A is a top plan view of the vehicle seat of FIG. 6A having occupant classification sensor placement superimposed thereon as an example embodiment of sensor placement.
Figure 9B:
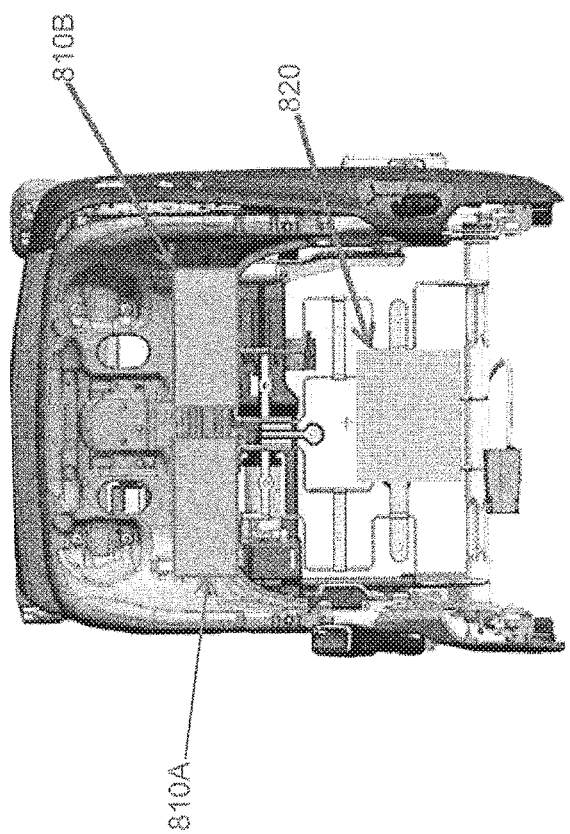
FIG. 9B is a top plan view of the vehicle seat of FIG. 6A having a different embodiment of an occupant classification sensor placement superimposed thereon as an example embodiment of split or dual sensor placement.

Other embodiments of the concepts described herein may be considered in terms of sensor placement, or as referred to herein, "occupant classification sensors" described above, relative to a vehicle seat base as shown in FIG. 6 and FIG. 7. FIGS. 6A and 6B illustrate sections of an example vehicle seat base and example dimensions of each. None of the figures or dimensions listed in the figures herein are limiting in any way, as the concepts described herein are applicable to vehicle seats of many different sizes and shapes. The example of FIGS. 6A and 6B, however show one vehicle seat base 602 as having a pan region 610 adjacent and/or connected to a springs region 620 of the base 602. FIG. 6B illustrates one example of the dimensions of usable space for sensors in the springs region 620. FIG. 9A shows another view of a vehicle seat base from a different perspective for sensor placement relative to other structures, such as a seat belt assembly, on the vehicle seat base. FIG. 9B illustrates that the front sensor proximate the pan region of the vehicle seat base may actually include at least two side-by-side sensors 810A, 810B.

FIG. 8 illustrates one example of OC sensors 810, 820 described above, placed onto a support structure 830 in a way that accommodates placing a first occupant classification sensor 810 proximate a seat pan region 810 near the front area of the vehicle seat and a second occupant classification sensor 820 near the springs region or rear area of the vehicle seat. In one non-limiting embodiment, the support structure holds sensors with copper tape plates separated by elastomeric spacers having a hardness rating of 40 durometers, or within a hardness range of 35 to 45 durometers. The position of the support structure 830 within the vehicle base is adjustable for different vehicle seat styles, and the edges of the support structure may be placed along an axis running from rear to front of the vehicle seat. In one non-limiting embodiment of the application, the support structure is positioned in the vehicle seat so as to be centered laterally across the vehicle seat such that a proximate edge of the first occupant classification sensor (810) relative to the steering wheel is adjacent a rear edge of a pan region of the vehicle seat and a distal edge of the second occupant classification sensor, relative to the steering wheel, is adjacent a back edge of a springs region of the vehicle seat. Intermediate positions between an absolute front edge of the vehicle seat and an absolute rear edge of the vehicle seat are also available to construct the sensor assembly in the seat base.

Figure 10:
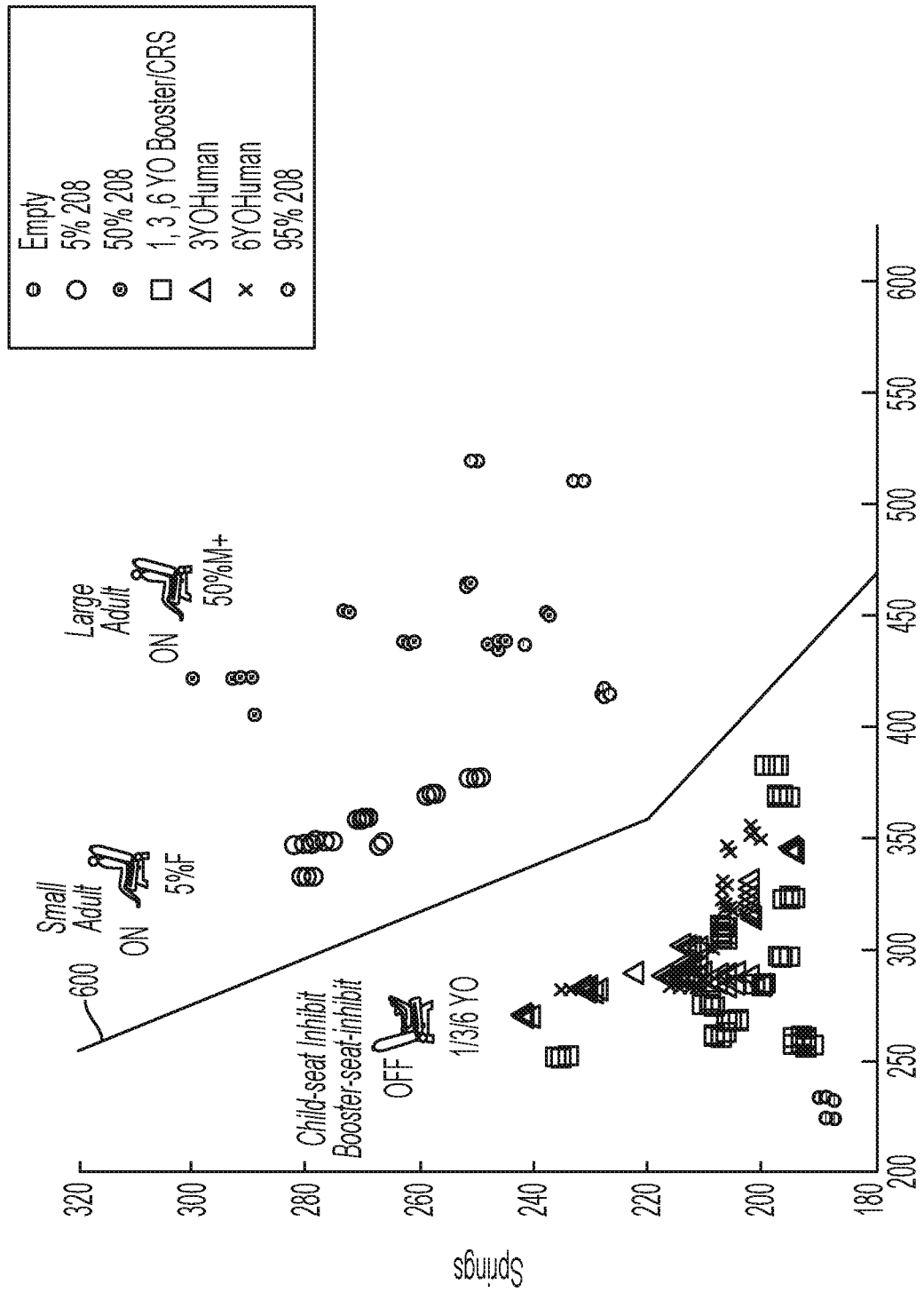
FIG. 10 is a plot of an occupant classification threshold boundary system utilizing an x-y coordinate system configured from quadrature components of sensing current measurements as ordinates.
Figure 11:
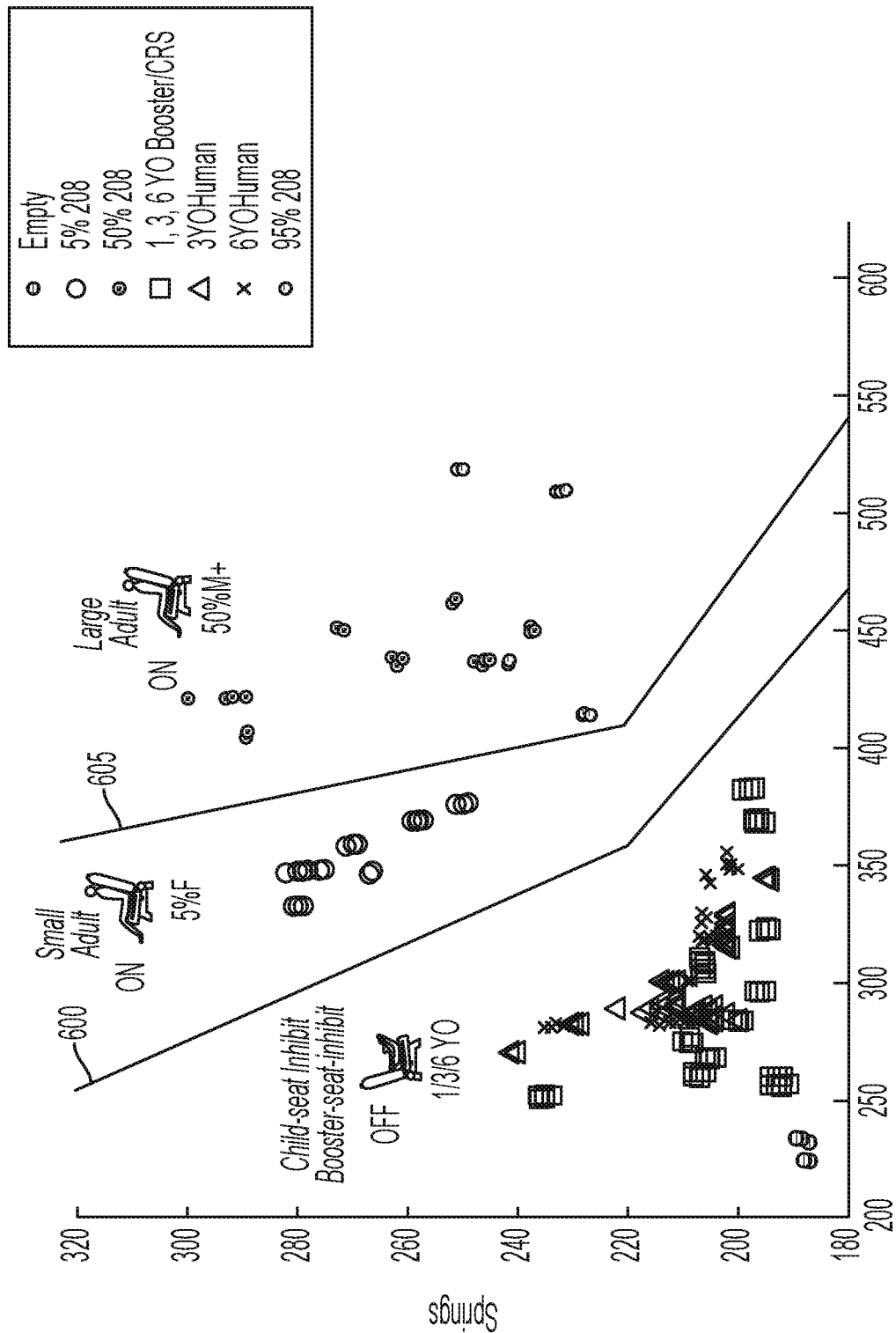
FIG. 11 is a plot of an occupant classification threshold boundary system utilizing an x-y coordinate system configured from quadrature components of sensing current measurements as ordinates.

FIGS. 10 and 11 illustrate how the embodiments of FIGS. 6-9 may result in more definite and reliable threshold boundaries that provide better separation between vehicle occupant sizes, particularly in regard to the above noted "grey zones" of the prior art. FIG. 10 is an example result of establishing a first threshold boundary 600 separating child occupants, such as the displayed six year old child data from small adult data, including the smaller adults who are within the 5% female category of the federal regulation (FMVSS 208). FIG. 11 goes further and plots a second threshold boundary 605 for separating and identifying different classifications of adults (i.e., separating out a 50% percentile by weight adult from smaller adults. For FIGS. 10 and 11, the two boundaries illustrated in the figures have been compiled from the test data (shown on the figures) gathered from the front and rear vehicle seat occupant classification sensors of FIGS. 6-9. Tests of this nature have accounted for numerous conditions such as seat model and construction as well as the kind of closed cell or open cell foam used as seat cushioning, which affects the sensor output.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature The present disclosure has been described with reference to example embodiments, however persons skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability.

Accordingly, all such modifications are intended to be included within the scope of the present disclosure. Other substitutions, modifications, changes and omissions may be made in the design, operating conditions and arrangement of the preferred and other exemplary embodiments without departing from the spirit of the present subject matter.

What is claimed is:

1. A system for classifying an occupant in a vehicle comprising:
   at least one pair of occupant classification sensors, each occupant classification sensor having a sensing electrode mountable in a seat bottom of a vehicle seat and a shield electrode located in the vehicle seat opposite the sensing electrode;

a respective sensing circuit operatively coupled to the respective sensing electrode and shield electrode for each occupant classification sensor in the at least one pair;

a controller comprising computer memory operatively coupled to a normalization circuit and the respective sensing circuits, a switch between the normalization circuit and the respective sensing circuits, wherein the switch isolates the normalization circuit from the sensing circuits to measure system impedance independently of the sensing circuit;

wherein the controller operates to configure the respective sensing circuits into a plurality of circuit configurations comprising a plurality of shield electrodes driven by at least one input voltage from the controller;

wherein in the circuit configurations the sensing electrode and the shield electrode are electrically coupled to the sensing circuit, wherein the controller sends a control signal to the sensing circuit, and measures a plurality of sensing current measurements, each sensing current measurement corresponding to one of the circuit configurations, wherein the sensing circuit is further configured to detect a change in at least one current characteristic of sensing current on at least one pair of sensing electrodes due to the presence of the object located on the vehicle seat, wherein the sensing circuits corresponding to the at least one pair of sensing electrodes provide, to the controller, a respective output signal corresponding to a respective change in the sensing current on the respective sensing electrodes, wherein the memory stores threshold data establishing occupant classifications according to threshold boundaries, and wherein the controller uses the respective output signals as a coordinate pair to identify a respective occupant classification for the coordinate pair relative to the threshold boundaries.

2. The system of claim 1, wherein the controller utilizes the threshold boundaries stored in the memory and evaluates the coordinate pair relative to the threshold boundaries to identify the respective occupant classification for the coordinate pair.

3. The system of claim 1, wherein the controller operates to configure the respective sensing circuits into four circuit configurations for each occupant classification sensor, and wherein the occupant classification sensors in respective sensing circuits provide the respective output signals simultaneously.

4. The system of claim 1, further comprising a left side occupant classification sensor and a right side occupant classification sensor, wherein the coordinate system comprises x-axis values and y-axis values, and wherein the x-axis values are Q values representing magnitudes of quadrature components of left side sensing current on a left side sensing electrode and the y-axis values represent additional magnitudes of quadrature components of right side sensing currents on a right side sensing electrode.

5. The system of claim 1 further comprising a front occupant classification sensor and a rear occupant classification sensor, wherein the coordinate system comprises x-axis values and y-axis values, and wherein the x-axis values are Q values representing magnitudes of the quadrature components of front sensing current on a front sensing electrode and the y-axis values represent additional magnitudes of quadrature components of rear sensing current on a rear sensing electrode.

6. The system of claim 1, the controller calculates impedance between the shield electrode and the corresponding sensing electrode, based on the change in current, to classify the object.

7. The system of claim 6, wherein the controller determines whether to activate a seat belt indicator or an air bag.

8. The system of claim 6, wherein a compressible material is disposed between the sensing electrode and the shield electrode.

9. The system of claim 1, further comprising additional pairs of occupant classification sensors positioned in respective zones of a vehicle seat.

10. The system of claim 1, wherein the threshold data establishes a first threshold boundary between a 6 year old child classification and a $5^{th}$ percentile female classification such that the controller compares the coordinate pair of the output signals to the first threshold boundary to identify the occupant classification for the coordinate pair.

11. The system of claim 1, wherein the threshold data establishes a second threshold boundary between a $5^{th}$ percentile female classification and a $50^{th}$ percentile male classification such that the controller compares the coordinate pair of the output signals to the second threshold boundary to identify the occupant classification for the coordinate pair.

12. The system of claim 1, wherein at least one occupant classification sensor is positioned proximately to a pan region of a base portion of the vehicle seat, and wherein at least one other occupant classification sensor is positioned proximately to a springs region of a base portion of the vehicle seat.

13. The system of claim 1, wherein the threshold boundaries and the output signals are applied to a coordinate system as impedance values for the respective occupant classification sensors.

14. The system of claim 13, wherein the controller overlays multiple sets of coordinate pairs onto a coordinate system that establishes the threshold boundaries such that output signals for multiple pairs of occupant classification sensors are compared by the controller and assigned occupant classifications relative to the threshold data.

15. A system for classifying objects positioned on a vehicle seat within a vehicle, the system comprising:
    a first occupant classification sensor secured to a front region of the vehicle seat;
    a second occupant classification sensor secured to a rear region of the vehicle seat;
    wherein each occupant classification sensor has a sensing electrode positioned oppositely a shield electrode;
    a respective sensing circuit operatively coupled to the respective sensing electrode and shield electrode for each occupant classification sensor;
    a controller comprising computer memory operatively coupled to the respective sensing circuits,
    wherein the controller operates to configure the respective sensing circuits into a plurality of circuit configurations comprising a plurality of shield electrodes driven by at least one input voltage from the controller; and
    wherein in the circuit configurations, the sensing electrode and the shield electrode are electrically coupled to the sensing circuit, wherein the controller sends a control signal to the sensing circuit;

a signal producing device driving at least one of the sensing electrode and the shield electrode to produce different voltages on the sensing electrode and the shield electrode;

and measures a plurality of sensing current measurements, each sensing current measurement corresponding to one of the circuit configurations, wherein the sensing circuit is further configured to detect a change in at least one current characteristic of sensing current on at least one pair of sensing electrodes due to the presence of the object located on the vehicle seat, wherein the sensing circuits corresponding to the at least one pair of sensing electrodes provide, to the controller, a respective output signal corresponding to a respective change in sensing current on the respective sensing electrodes.

16. A system according to claim 15, wherein the front region corresponds to a pan region of a vehicle seat base.

17. A system according to claim 15, wherein the rear region corresponds to a springs region of a vehicle seat base.

18. A system according to claim 15, wherein the sensing electrode and the shield electrode comprise copper tape plates separated by elastomeric spacers.

19. A system according to claim 18, wherein the elastomeric spacers have a hardness measurement in the range of 35 durometers to 45 durometers.

20. A system according to claim 15, wherein the support structure is positioned in the vehicle seat so as to be centered laterally across the vehicle seat such that a proximate edge of the first occupant classification sensor is adjacent a rear edge of a pan region of the vehicle seat and a distal edge of the second occupant classification sensor is adjacent a back edge of a springs region of the vehicle seat.

21. A system according to claim 15, wherein the first occupant classification sensor comprises a left split sensor and a right split sensor positioned in the vehicle seat to define a space there between.

22. The system of claim 15, wherein the controller operates to configure the respective sensing circuits into four circuit configurations for each occupant classification sensor.

23. The system of claim 15, wherein the memory stores threshold data establishing occupant classifications according to threshold boundaries in a coordinate system comprising Q values of the first occupant classification sensor on an x-axis and additional Q values of the second occupant classification sensor on the y-axis, wherein Q values represent magnitudes of the quadrature components of sensing current signals on respective sensing electrodes of each occupant classification sensor and wherein the controller uses the respective output signals as a coordinate pair to place within the coordinate system and identify a respective occupant classification for the coordinate pair.

24. The system of claim 15, wherein the controller is furthermore operatively coupled to a normalization circuit and the respective sensing circuits, the system further comprising a switch between the normalization circuit and the respective sensing circuits, wherein the switch isolates the normalization circuit from the sensing circuits to measure system impedance independently of the sensing circuit.

* * * * *